(12) United States Patent
Wilder et al.

(10) Patent No.: US 10,863,013 B2
(45) Date of Patent: Dec. 8, 2020

(54) PORTABLE DEVICE CASE FOR REMOVABLY ATTACHING ACCESSORIES

(71) Applicant: VIBES AUDIO LLC, Irvine, CA (US)

(72) Inventors: Shane Wilder, Aliso Viejo, CA (US); Scharles Wilder, San Diego, CA (US)

(73) Assignee: VIBES AUDIO LLC, Irvine, CA (US)

( * ) Notice: Subject to any disclaimer, the term of this patent is extended or adjusted under 35 U.S.C. 154(b) by 0 days.

(21) Appl. No.: 16/340,078

(22) PCT Filed: Oct. 4, 2017

(86) PCT No.: PCT/US2017/055118
§ 371 (c)(1),
(2) Date: Apr. 5, 2019

(87) PCT Pub. No.: WO2018/067688
PCT Pub. Date: Apr. 12, 2018

(65) Prior Publication Data
US 2020/0059546 A1   Feb. 20, 2020

Related U.S. Application Data

(63) Continuation-in-part of application No. 15/287,211, filed on Oct. 6, 2016, now Pat. No. 9,887,725.

(60) Provisional application No. 62/526,997, filed on Jun. 29, 2017.

(51) Int. Cl.
*H04M 1/00* (2006.01)
*H04M 1/215* (2006.01)
*H04B 1/3888* (2015.01)

(52) U.S. Cl.
CPC .......... *H04M 1/215* (2013.01); *H04B 1/3888* (2013.01)

(58) Field of Classification Search
CPC ............................ H04M 1/215; H04B 1/3888
USPC ...................................................... 455/575.8
See application file for complete search history.

(56) References Cited

U.S. PATENT DOCUMENTS

| | | |
|---|---|---|
| 5,245,669 A | 9/1993 | Bittencourt |
| D344,261 S | 2/1994 | Watanabe |
| 6,675,931 B2 | 1/2004 | Sahyoun |
| D542,287 S | 5/2007 | Chung et al. |

(Continued)

FOREIGN PATENT DOCUMENTS

| | | |
|---|---|---|
| CN | 1949672 A | 4/2007 |
| CN | 103843311 A | 6/2014 |

(Continued)

OTHER PUBLICATIONS

U.S. Appl. No. 29/671,962, filed Nov. 30, 2018, Wilder et al.

(Continued)

*Primary Examiner* — Sonny Trinh
(74) *Attorney, Agent, or Firm* — Knobbe, Martens, Olson & Bear, LLP

(57) ABSTRACT

A portable device case can be engage various removably attachable accessories. The case is sized and shaped to at least partially enclose the mobile device and includes an opening sized and shaped to receive at least a portion of a casing of an accessory, a top flange sized and shaped to removably engage with a top flange of the casing of the accessory, and a bottom flange sized and shaped to removably engage with a bottom flange of the casing of the accessory. Various accessories and removable attachments can be used with the case.

22 Claims, 30 Drawing Sheets

(56) References Cited

U.S. PATENT DOCUMENTS

| | | | |
|---|---|---|---|
| 7,457,407 B2 | 11/2008 | Sun et al. | |
| D586,787 S | 2/2009 | Rivard et al. | |
| D596,158 S | 7/2009 | Ragde, Jr. et al. | |
| D596,618 S | 7/2009 | Zha | |
| 7,639,830 B2 | 12/2009 | Schell et al. | |
| 7,653,209 B2 | 1/2010 | Abe et al. | |
| D624,304 S | 9/2010 | Danze et al. | |
| D635,555 S | 4/2011 | Giles | |
| D639,731 S | 6/2011 | Sun | |
| 7,985,501 B2 | 7/2011 | Kim et al. | |
| D644,428 S | 9/2011 | Feng | |
| D654,931 S | 2/2012 | Lemelman et al. | |
| 8,251,210 B2 * | 8/2012 | Schmidt | H04M 1/04 206/320 |
| D669,459 S | 10/2012 | Kim | |
| D674,803 S | 1/2013 | Westrup | |
| 8,435,656 B2 | 5/2013 | Koh et al. | |
| D685,728 S | 7/2013 | Hoshi et al. | |
| D685,738 S | 7/2013 | Moore et al. | |
| 8,485,404 B2 | 7/2013 | Monaco et al. | |
| D688,654 S | 8/2013 | Stevinson | |
| 8,616,422 B2 | 12/2013 | Adelman et al. | |
| D703,651 S | 4/2014 | Ehrlich | |
| D704,194 S | 5/2014 | Young | |
| 8,833,379 B1 | 9/2014 | Kaplan | |
| D719,950 S | 12/2014 | Smith et al. | |
| D723,533 S | 3/2015 | Stevinson | |
| D724,785 S | 3/2015 | Frederick | |
| D725,093 S | 3/2015 | Sun et al. | |
| D725,643 S | 3/2015 | Lee et al. | |
| D726,144 S | 4/2015 | Kang | |
| D726,701 S | 4/2015 | Stevinson | |
| D735,184 S | 7/2015 | Lee et al. | |
| D735,706 S | 8/2015 | Stevinson | |
| D744,470 S | 12/2015 | Stevinson | |
| D746,801 S | 1/2016 | Pan | |
| 9,236,617 B2 | 1/2016 | Ogami et al. | |
| D756,967 S | 5/2016 | Manz | |
| D759,004 S | 6/2016 | Stevinson | |
| D765,069 S | 8/2016 | Jeffrey | |
| D769,854 S | 10/2016 | Duval et al. | |
| 9,467,189 B2 * | 10/2016 | Day | H04B 1/3888 |
| 9,525,946 B2 | 12/2016 | Bank | |
| D775,618 S | 1/2017 | Kim et al. | |
| 9,653,724 B2 | 5/2017 | Lim | |
| D789,343 S | 6/2017 | Hawes et al. | |
| D791,115 S | 7/2017 | Schilling | |
| 9,887,725 B1 | 2/2018 | Wilder et al. | |
| 9,903,686 B2 | 2/2018 | Maynard | |
| D819,620 S | 6/2018 | Parker | |
| 10,027,788 B2 | 7/2018 | Pierce | |
| D835,087 S | 12/2018 | Wilder et al. | |
| D836,620 S | 12/2018 | Ehrlich | |
| D837,776 S | 1/2019 | Chung | |
| D841,636 S | 2/2019 | Turk | |
| 10,211,876 B2 | 2/2019 | Wilder et al. | |
| D848,366 S | 5/2019 | Lian | |
| D857,687 S | 8/2019 | Frederick | |
| D865,741 S | 11/2019 | Hawes et al. | |
| D868,051 S | 11/2019 | Kim et al. | |
| D869,453 S | 12/2019 | Wilder et al. | |
| D884,691 S | 5/2020 | Wilder et al. | |
| 2004/0092172 A1 * | 5/2004 | Munger, Jr. | H01R 13/645 439/680 |
| 2005/0168111 A1 | 8/2005 | Bank et al. | |
| 2007/0087263 A1 | 4/2007 | Ge et al. | |
| 2009/0084705 A1 | 4/2009 | Justiss | |
| 2012/0206303 A1 * | 8/2012 | Desclos | H01Q 1/243 343/702 |
| 2013/0157730 A1 | 6/2013 | McCormac et al. | |
| 2013/0181584 A1 | 7/2013 | Whitten et al. | |
| 2013/0334070 A1 | 12/2013 | Adelman et al. | |
| 2014/0135080 A1 | 5/2014 | Kimball et al. | |
| 2014/0216976 A1 | 8/2014 | Conarro | |
| 2014/0262850 A1 | 9/2014 | Kolton | |
| 2014/0290917 A1 | 10/2014 | Chang et al. | |
| 2015/0327812 A1 * | 11/2015 | Poplaw | H04M 1/026 600/586 |
| 2015/0341712 A1 | 11/2015 | Wilcox et al. | |
| 2016/0118016 A1 | 4/2016 | DiPrizio | |
| 2019/0045041 A1 | 2/2019 | Pierce | |
| 2019/0288725 A1 | 9/2019 | Wilder et al. | |

FOREIGN PATENT DOCUMENTS

| | | |
|---|---|---|
| CN | 104053328 A | 9/2014 |
| CN | 107211053 A | 9/2017 |
| JP | 5483407 B2 | 5/2014 |
| KR | 3006336210000 | 2/2012 |
| KR | 3008836580000 | 12/2016 |
| KR | 3008854610000 | 12/2016 |
| KR | 3009120470000 | 6/2017 |
| WO | WO 2016/069652 A1 | 5/2016 |

OTHER PUBLICATIONS

International Search Report and Written Opinion of the International Searching Authority for International Application No. PCT/US2017/055118, dated Feb. 13, 2018, in 14 pages.

U.S. Appl. No. 29/609,364, filed Jun. 29, 2017, Wilder et al.

U.S. Appl. No. 16/277,702, filed Feb. 15, 2019, Wilder et al.

Roxon Modular Smartphone System, Vibes Modular, downloaded from https://vibesmodular.com/ on Apr. 30, 2018, in 6 pages.

Vibes Audio Vibrox review, posted at Digitaltrends.com, posting date Dec. 12, 2017, [online], [site visited Dec. 15, 2017]. Available from Internet, <URL: https ://www.digitaltrends.com/music/vibes-audio-vibrox-review/>.

Review: Viberox Sound Engine, publication date Feb. 13, 2018, [online][site visited Dec. 18, 2019] URL: https://www.prosoundnetwork.com/archives/review-viberox-sound-engine (Year: 2018).

Vibes Audio Modular Smartphone Accessories Featuring Baserox, Vibrox, an Voltrox, publication date Jan. 2, 2018, [online][site visited Dec. 18, 2019] URL: https://gstylemag.com/2018/01/02/vibes-aud io-modular-smartphone-accessories-featuri ng-baserox-vi brox-and-voltrox/ (Year: 2018).

Extended European Search Report for European Patent Application No. 17859110.3, dated Oct. 15, 2020, in 12 pages.

\* cited by examiner

PORTABLE DEVICE CASE FOR REMOVABLY ATTACHING ACCESSORIES

CROSS-REFERENCE TO RELATED APPLICATIONS

This application is the U.S. National Phase under 35 U.S.C. § 371 of International Application PCT/US2017/055118, filed Oct. 4, 2017, which is a continuation in part of U.S. application Ser. No. 15/287,211, filed Oct. 6, 2016, and claims priority to U.S. Provisional Application No. 62/526,997, filed Jun. 29, 2017, the entirety of each of which is incorporated herein by reference and made a part of this specification.

BACKGROUND

Field

This disclosure relates generally to cases and accessories for mobile devices. More particularly, the disclosure relates to modular cases for mobile devices with removably attaching/attachable accessories.

Description of the Related Art

The following background information presents examples of specific aspects of the related art that, while expected to be helpful to further educate the reader as to additional aspects of the related art, is not to be construed as limiting the present disclosure, or any embodiments thereof, to anything stated or implied therein or inferred therefrom.

Mobile device (e.g., cellular phone) technology has advanced tremendously in recent years. For example, the size of these devices has continued to decrease. Unfortunately, the audio technology (e.g., speakers, microphones, etc.) embedded in these devices has remained stagnant or largely unchanged as these devices shrink in size. In addition, while various cell phone accessories have become available, attaching such accessories to the cell phone is very cumbersome, simply not possible, obsolescence of the device causes the accessory to be unuseful.

Many manufacturers have designed wired and wireless speakers for use with mobile devices, such as cellular phones, including smartphones. These speakers are generally large, separate devices that perform similar to conventional audio speakers connected to an audio source. These audio devices are not readily portable with the mobile device, as both the speaker and the mobile device are separate devices that, if linked at all, are only interconnected by a removable wired connection. Moreover, these typical wired and wireless speakers are one-way in that they provide audio output from the mobile device, but do not permit two-way communication.

Several manufacturers offer hands-free calling modules that can connect via a wireless signal, such as Bluetooth, to a mobile device. These devices allow users to conduct phone calls without having to hold the phone to one's ear and speak into the phone itself. However, like the wired and wireless speakers described above, these devices are not carried with or attached to the mobile device. Thus, the user is required to carry both their mobile device in addition to the hands-free calling module.

This Background is provided to introduce a brief context for the Summary and Detailed Description that follow. This Background is not intended to be viewed as limiting the claimed subject matter to implementations that solve any or all of the disadvantages or problems presented herein.

SUMMARY

In view of the foregoing, there is a need for an attachment for simple mounting of one or more accessories to a cell phone. For example, there is a need for a conference call module that can produce excellent sound quality, can wirelessly connect to a mobile device, and can be carried easily with the mobile device, but can also be removable as a separate module therefrom.

A speaker and conference call module and mobile device case combination allows a mobile device, such as a smartphone, to be retained by the mobile device case. The speaker and conference call module is configured to wirelessly connect to the mobile device to permit audio from the mobile device to be played thereupon. The speaker and conference call module further includes a microphone to permit audio pick-up by the module and deliver that audio signal to the mobile device, permitting two-way conference call features. The speaker and conference call module can produce sound via one or more exciter voice coils internally attached to the front surface thereof, where the front surface may be a material suitable for sound generation via an exciter, such as a carbon fiber material. The speaker and conference call module can be removed from and reattached to the mobile device case for convenient portability.

According to the present disclosure, a speaker and conference call module includes one or more of the following: a main housing; a front face forming a front surface of the main housing; one or more exciters attached to an internal surface of the front face; a wireless transceiver configured to receive an audio signal from an electronic device; a plurality of control buttons disposed on an exterior of the main housing; and/or a battery providing operating power to the conference call module.

According to the present disclosure, a combination mobile device case and speaker and conference call module includes one or more of the following: a speaker and conference call module including a main housing, a front face forming a front surface of the main housing, one or more exciters attached to an internal surface of the front face, a wireless transceiver configured to receive an audio signal from an electronic device, a plurality of control buttons disposed on an exterior of the main housing, a battery providing operating power to the conference call module, and/or a protruding back housing extending from a portion of a back side of the main housing; and/or a mobile device case including an opening on a back surface of the mobile device case, the opening having a periphery, the opening sized to receive the protruding back housing therein with the main housing resting adjacent the periphery when the speaker and conference call module is mounted onto the mobile device case.

According to the present disclosure, a combination mobile device case and speaker and conference call module includes one or more of the following: a speaker and conference call module comprising a main housing, a front face forming a front surface of the main housing, the front face formed from carbon fiber, one or more exciters attached to an internal surface of the front face, a wireless transceiver configured to receive an audio signal from an electronic device; a plurality of control buttons disposed on an exterior of the main housing, a water resistant microphone disposed on the exterior of the main housing, Wherein the wireless receiver is configured to send a microphone-received audio signal to the electronic device, a battery providing operating power to the conference call module, and/or a protruding back housing extending from a portion of a back side of the main housing; and/or a mobile device case including an opening on a back surface of the mobile device case, the opening having a periphery, the opening sized to receive the protruding back housing therein with the main housing resting adjacent the periphery when the speaker and conference call module is mounted onto the mobile device case.

In some embodiments, the combination mobile device and speaker and conference call module further comprises a slide portion configured to slide on the protruding back housing and extend beyond at least one side edge of the protruding back housing.

In some embodiments, the combination mobile device and speaker and conference call module further comprises a button on the main housing, the button being mechanically connected to the slide portion, the button being resiliently depressible to move the slide portion to a compressed configuration, where the slide portion extends beyond the at least one side edge less than when the button is not depressed, wherein the slide portion fits under the periphery of the opening to removably retain the conference call module onto the mobile device case.

In some embodiments, the speaker and conference call module (and/or combination thereof with the mobile device case) can include one or more the following: the front face is formed from carbon fiber; a water resistant microphone disposed on the exterior of the main housing; the wireless transceiver is configured to send a microphone-received audio signal to the electronic device; a protruding back housing extending from a portion of a back side of the main housing; a slide portion configured to slide on the protruding back housing and extend beyond at least one side edge of the protruding back housing; a button on the main housing, the button being mechanically connected to the slide portion, the button being resiliently depressible to move the slide portion to a compressed configuration; the slide portion extends beyond the at least one side edge less than when the button is not depressed; slide portion fits under the periphery of the opening to removably retain the speaker and conference call module onto the mobile device case; a mobile device case, the mobile device case operable to retain a mobile device therein; the mobile device case including an opening on a back surface of the mobile device case, the opening having a periphery; the protruding back housing fits into the opening and the main housing rests adjacent the periphery of the opening; the slide portion fits under the periphery of the opening to removably retain the speaker and conference call module onto the mobile device case; and/or the carbon fiber forming the front face has a thickness from about 0.6 mm to about 0.75 mm.

According to the present disclosure; an accessory system for a mobile device e includes one or more of the following: a case sized and shaped to at least partially enclose a mobile device, the case including a female connector on a back surface thereof, the female connector comprising: an opening extending through the back surface of the case; a top flange positioned in a top portion of the case and at least partially in the opening; and/or a bottom flange positioned in a bottom portion of the case and at least partially in the opening; and/or an accessory comprising a main casing including a male connector configured to be removably coupled to the female connector of the case, the male connector comprising: a protruding back casing extending away from the main casing, the protruding back casing sized and shaped to be received within the opening of the case, the protruding back casing including a bottom flange on a bottom edge thereof, the bottom flange of the protruding back configured to be engaged with the bottom flange of the case; and/or a fastener including a top flange on a top edge thereof, the top flange of the fastener configured to be engaged with the top flange of the case, the fastener actuable to cause disengagement of at least one of the top flange of the fastener from the top flange of the case or the bottom flange of the protruding back casing from the bottom flange of the case in order to decouple the accessory from the case.

In some embodiments, the accessory system can include one or more of the following: the accessory comprises a speaker; the speaker comprises at least one transducer attached to a surface of the main casing; the surface of the main casing of the speaker comprises carbon fiber; the speaker comprises a wireless transceiver configured to receive an audio signal from the mobile device; the speaker comprises a microphone; at least one mounting plate configured to be coupled to the case or the speaker when the speaker is decoupled from the case; the mounting plate includes a female connector comprising: a recess extending at least partly into a front surface of the mounting plate; a top edge of the recess including a flange; and/or a bottom edge of the recess including a flange; the mounting plate includes a mounting bracket; the mounting bracket is configured to attach to handlebars; the mounting plate is configured to attach to a belt clip; the mounting plate includes at least one hole extending therethrough for attaching the mounting plate to a wall; the mounting plate includes a male connector comprising: a protruding back casing extending away from a front surface of the mounting plate, the protruding back casing sized and shaped to be received within the opening of the case, the protruding back casing including a flange on a bottom edge thereof configured to engage with the bottom flange of the case; and/or a fastener including a flange on a top edge thereof and configured to engage with the top flange of the case, the fastener actuable by a button configured to cause displacement of the mounting plate; the mounting plate includes a mounting bracket on a back surface thereof; the mounting bracket is configured to attach to handlebars; a charging device including a female connector configured to couple to the male connector of the speaker when the speaker is decoupled from the case; the speaker is configured for inductive charging; the fastener comprises a button configured to decouple the accessory from the case, the button connected to the top flange of the fastener to move the top flange toward the bottom edge of the protruding back to disengage the top flange of the fastener from the top flange of the case; the protruding back of the accessory is configured to be slid into the opening in the case; and/or the accessory comprises at least one of a storage device, a power source, or a decorative plate.

According to the present disclosure, an accessory mounting case for a mobile device includes one or more of the following: a casing sized and shaped to at least partially enclose a mobile device; an opening extending through at least a portion of the casing, the opening sized and shaped to receive at least a portion of a casing of an accessory; a top flange positioned in a top portion of the casing and at least partially in the opening, the top flange sized and shaped to removably engage with a top flange of the casing of the accessory; and/or a bottom flange positioned in a bottom portion of the casing and at least partially in the opening, the bottom flange sized and shaped to removably engage with a bottom flange of the casing of the accessory. In some embodiments, the opening is configured to slidably receive at least a portion of the casing of the accessory.

According to the present disclosure, a mounting assembly for a mobile device includes one or more of the following: a case sized and shaped to at least partially enclose a mobile device, the case comprising a first connector, the first connector comprising: a first flange; and/or a second flange positioned opposite the first flange; and/or an accessory comprising a second connector configured to be removably coupled to the first connector of the case, the second connector comprising: a third flange configured to engage with the first flange of the case, the third flange moveable to selectively engage and disengage the first flange; and/or a fourth flange configured engage with the second flange of the case. The third and fourth flanges are configured to engage the first and second flanges to securely assemble the accessory to the case.

In some embodiments, the mounting assembly can include one or more of the following: the first connector comprises an opening having a periphery; the first and second flanges extend into the opening from the periphery, the opening configured to accept at least partly the second connector; the first connector comprises a portion extending at a predetermined angle relative a surface of the case configured to face outwardly away from the mobile device, the portion configured to guide the second connector into the opening for the second connector to engage with the first connector; the predetermined angle ranges from 1 to 60 degrees; the portion of the first connector is configured to inhibit rotation of the second connector relative to the first connector; the second connector comprises a portion configured slidably engage the portion of the first connector to guide the second connector relative to the first connector; the first flange extends at least an extent of a side of the opening of the first connector; the second flange extends at least an extent of a side of the opening of the first connector; the second connector comprises a projection configured to at least partially enter the opening of the first connector; the third flange extends an extent less than an extent of a side of the projection of the second connector; the fourth flange extends at least an extent of a side of the projection of the second connector; the third and fourth flanges are configured to engage the first and second flanges to inhibit rotation or lateral movement of the second connector relative to the first connector; the accessory further comprises an actuator configured to move the third flange to selectively engage and disengage with the first flange; the actuator is directly connected to or formed from a monolithic material with the third flange; the actuator is biased in a predetermined position by an elastic component operatively connected to the actuator; and/or the fourth flange is capable of pivoting about the second flange to position the third flange to engage the first flange.

According to the present disclosure, an accessory mounting case for a mobile device includes one or more of the following: a casing configured to accept a mobile device; a first flange; and/or a second flange. The first flange is configured to engage with a third flange of a housing of an accessory, the third flange moveable to selectively engage and disengage the first flange. The second flange is configured to releasably engage with a fourth flange of the housing of the accessory. The first and second flanges are configured to engage the third and fourth flanges to securely assemble the case to the accessory.

In some embodiments, the accessory mounting case can include one or more of the following: an opening having a periphery; the first and second flanges extend into the opening from the periphery, the opening configured to accept at least partly the third and fourth flanges; a portion extending at a predetermined angle relative a surface of the case configured to face outwardly away from the mobile device, the portion configured to guide a part of accessory into the opening for the part of the accessory to engage with the casing; the predetermined angle ranges from 1 to 60 degrees; the portion is configured to inhibit rotation of the accessory relative to the casing; the first flange extends at least an extent of a side of the opening; the first flange is opposite the second flange in the opening; the second flange extends at least an extent of a side of the opening; and/or the first and second flanges are configured to engage the third and fourth flanges to inhibit rotation or lateral movement of accessory relative to the casing.

According to the present disclosure, an accessory mounting device for a portable accessory includes a connector configured to mount to a housing having a first flange and a second flange, the connector comprising: a third flange configured to releasably engage with the first flange; and/or a fourth flange configured to releasably engage with the second flange. The third and fourth flanges are configured to engage the first and second flanges to securely assemble the portable accessory to the accessory mounting device.

In some embodiments, the accessory mounting case can include one or more of the following: the connector comprises a portion configured to slidably engage housing to guide the housing relative to the connector; the connector comprises a projection configured to at least partially enter an opening or a recess of the housing; the third flange extends an extent less than an extent of a side of the projection of the connector; the fourth flange extends at least an extent of a side of the projection of the connector; the third and fourth flanges are configured to engage the first and second flanges to inhibit rotation or lateral movement of the connector relative to the housing; an actuator configured to move the third flange to selectively engage and disengage with the first flange; the actuator is directly connected to or formed from a monolithic material with the third flange; an elastic component configured to bias the actuator in a predetermined position; and/or the fourth flange is capable of pivoting about the second flange to position the third flange to engage the first flange.

A method of using the foregoing systems, assemblies, combinations, cases, and/or devices is included; the method of use can include using or assembling any one or more of the foregoing features to achieve functions and/or features of the systems, assemblies, combinations, cases, and/or devices as discussed in this disclosure. A method of manufacturing the foregoing systems, assemblies, combinations, cases, and/or devices is included; the method of manufacture can include providing, making, connecting, assembling, and/or installing any one or more of the foregoing features of the systems, assemblies, combinations, cases, and/or devices to achieve functions and/or features of the systems, assemblies, combinations, cases, and/or devices as discussed in this disclosure.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 3D is a tangential cross-section view of the speaker module coupled to the case for the mobile device, illustrated with the mobile device removed.

Figure 1A:
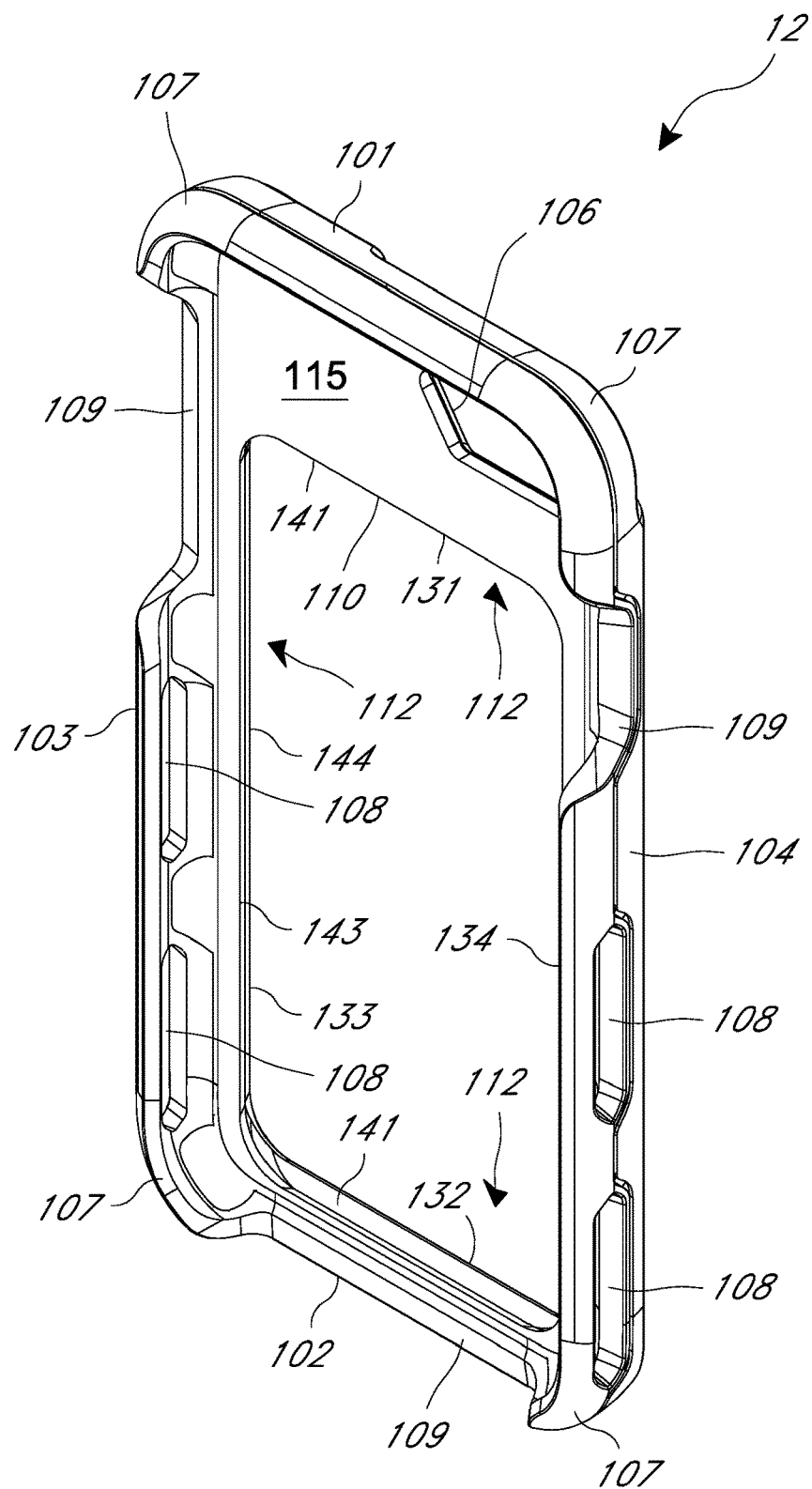
FIG. 1A illustrates a front isometric view of an embodiment of a case for a mobile device.

The disclosure and its various embodiments can now be better understood by turning to the following detailed description wherein illustrated embodiments are described. It is to be expressly understood that the illustrated embodiments are set forth as examples and not by way of limitations on the protection as ultimately defined in the claims.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

Broadly, embodiments of the present disclosure provide mobile device cases and accessories configured to removably attach (or couple) thereto. The mobile device cases and accessories can include standardized male and/or female connectors, such that the mobile device cases and accessories can be attached or coupled to one another in various combinations.

In one example, a mobile device case can be configured to receive a mobile device. The mobile device case can include a connector (such as a female connector) configured to removably couple with a corresponding connector (such as a corresponding male connector) on various accessories, such as a speaker module, a mounting plate, a decorative plate or case, a storage device, or a charging device.

The speaker module may be configured to wirelessly connect to (i.e., establish wireless communication with) the mobile device to permit audio from the mobile device to be played on the speaker module. In some embodiments, the speaker module produces sound via one or more transducers, such as an exciter attached to a surface (such as a front or back surface) thereof. The front or back surface may be formed of a material suitable for sound generation via the transducer(s), such as a plastic, glass, or carbon fiber material. In some embodiments, the speaker module comprises a speaker and conference call module that may further include a microphone to permit audio pick-up by the module and deliver that audio signal to the mobile device, permitting two-way conference call features.

The speaker module can include a connector (such as a male connector) configured to removably couple to the corresponding connector on the mobile device case such that it can be removed from and reattached (e.g., releasably attached, coupled, connected, interconnected, joined, associated, secured, bound, etc.) to the mobile device case for convenient, releasable mounting. The connector of the speaker module (and other accessories) can also be configured to removably couple with corresponding connectors on various other accessories, such as charging devices (e.g., for charging the speaker module) and/or various mounting plates. Similarly, the connector on the mobile device can also be configured to removably couple with corresponding connectors on various other accessories, such as mounting plates. Disclosed herein is a connector system (e.g., a mounting device or assembly 112) to allow various components and accessories to be releasably interconnected between various other components and accessories to provide a versatile, portable, and interchangeable system for a mobile device case and associated accessories (which can be considered portable accessories to be carried with the mobile device, e.g., portable device).

Accordingly, the connectors included on the various cases and/or devices described herein can be standardized according to the system and connection mechanisms disclosed (e.g., mounting device or assembly 112 as discussed herein) such that many of the cases and/or devices can removably attach to or couple with many of the other cases and/or devices in a wide variety of combinations. This may advantageously allow a user to couple the cases and/or devices together in various combinations as desired. This may improve the portability and ease of use of the devices as well as prolong the useful life of the accessories beyond the life of the mobile device and/or case.

Figure 1B:
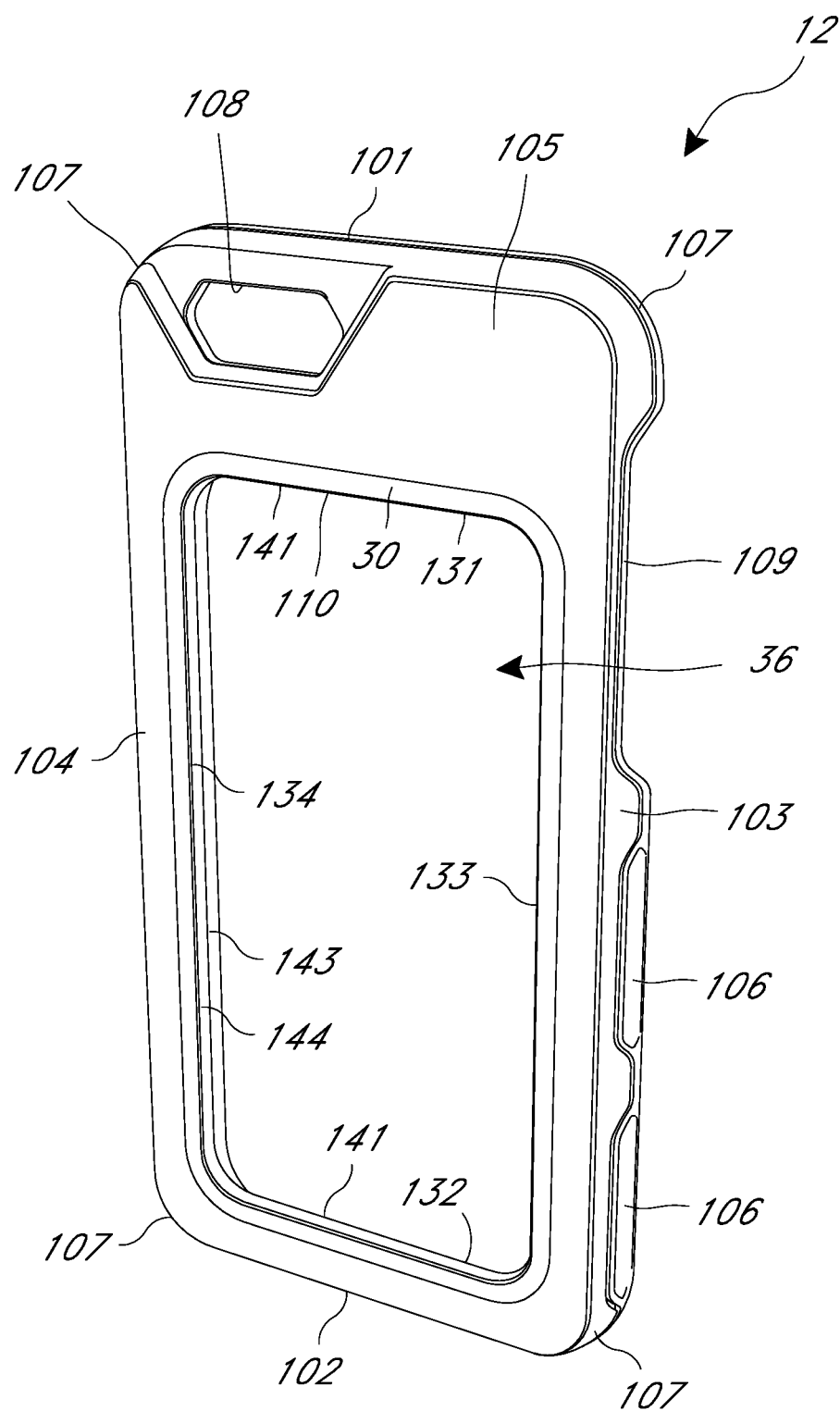
FIG. 1B is a back isometric view of the case of FIG. 1A.
Figure 1C:
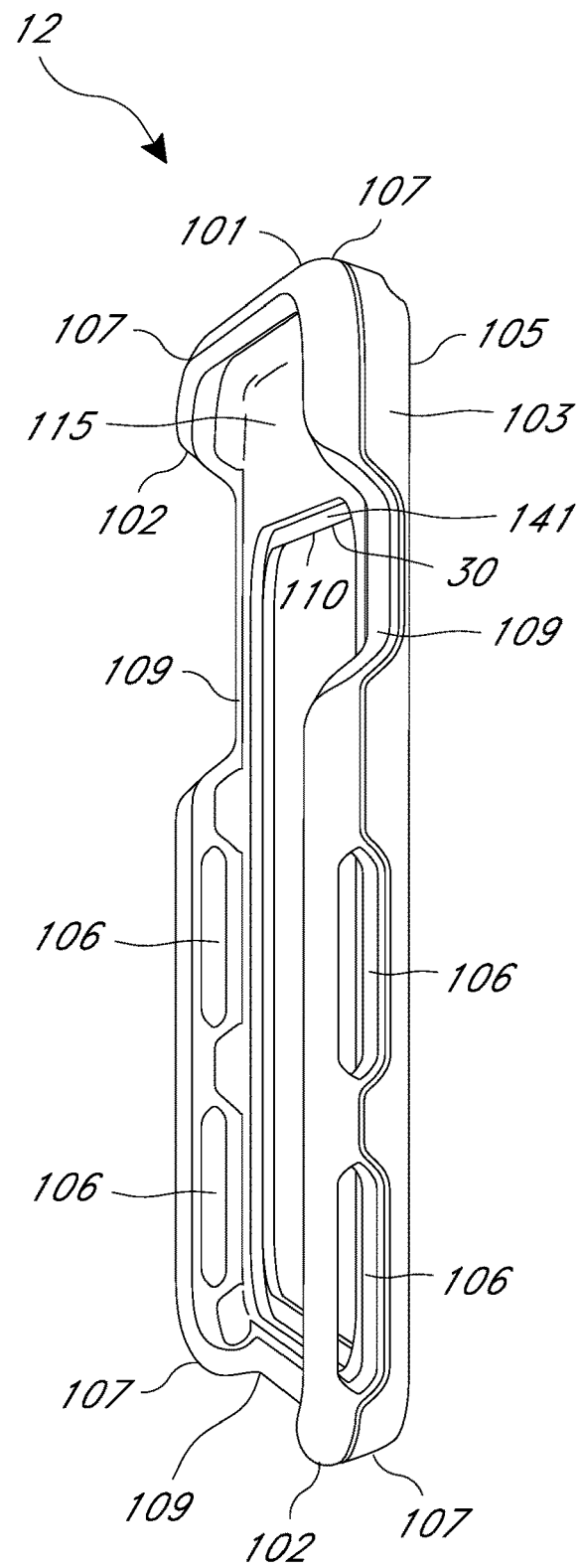
FIG. 1C is a side isometric view of the case of FIG. 1A.

FIGS. 1A-1C illustrate front, back, and side isometric views, respectively, of an embodiment of a casing or case 12 for a mobile device (e.g., accessory mounting case). In FIGS. 1A-1C, the case 12 is illustrated without being attached to the mobile device. The case 12 may be configured for use with a wide variety of mobile devices, including cellular phones, such as smart phones. The case 12 may also be configured for use with other types of mobile devices, such as music playing devices (e.g., mp3 players), tablets, laptops, portable gaming devices, etc.

In some embodiments, the case 12 is configured to provide protection for the mobile device. For example, the case 12 may provide a protective structure that surrounds the mobile device on one or more sides of the mobile device. In the illustrated embodiment, the case 12 includes a top side 101, a bottom side 102, a right side 103, a left side 104, and a back side 105. The various relative terms of top, bottom, right, left, and back (or other relative terms used herein) are designated for convenience of discussion and may be interchanged depending on the perspective from which the component or feature is being viewed. When installed on a mobile device the top side 101, the bottom side 102, the right side 103, the left side 104, and the back side 105 at least partially cover corresponding top, bottom, left, right, and back sides of the mobile device. The corners 107 of the case 12 may be reinforced to provide added protection against drops of the mobile device and other types of damage.

In some embodiments, one or more of the sides (i.e., the top side 101, the bottom side 102, the right side 103, the left side 104, and the back side 105) may include cutouts are configured in size, shape, and position to allow access to buttons or other user inputs on the mobile device. In the illustrated embodiment, the right, left, and back sides 103, 104, 105 include cutouts formed as apertures or openings 106 extending therethrough, and the right, left, and bottom sides 103, 104, 102 include a cutouts or recesses 109. The openings 106 and recesses 109 can be configured to allow access to various buttons, speakers, microphones, cameras, flashes, etc. on the mobile device.

The case 12 may be formed from rubber, plastic, or other suitable materials. In some embodiments, suitable materials include semi-rigid materials that provide some protection and/or cushioning for the mobile device and that are also partially compliant to allow the case 12 to be snapped onto the mobile device.

Figure 5A:
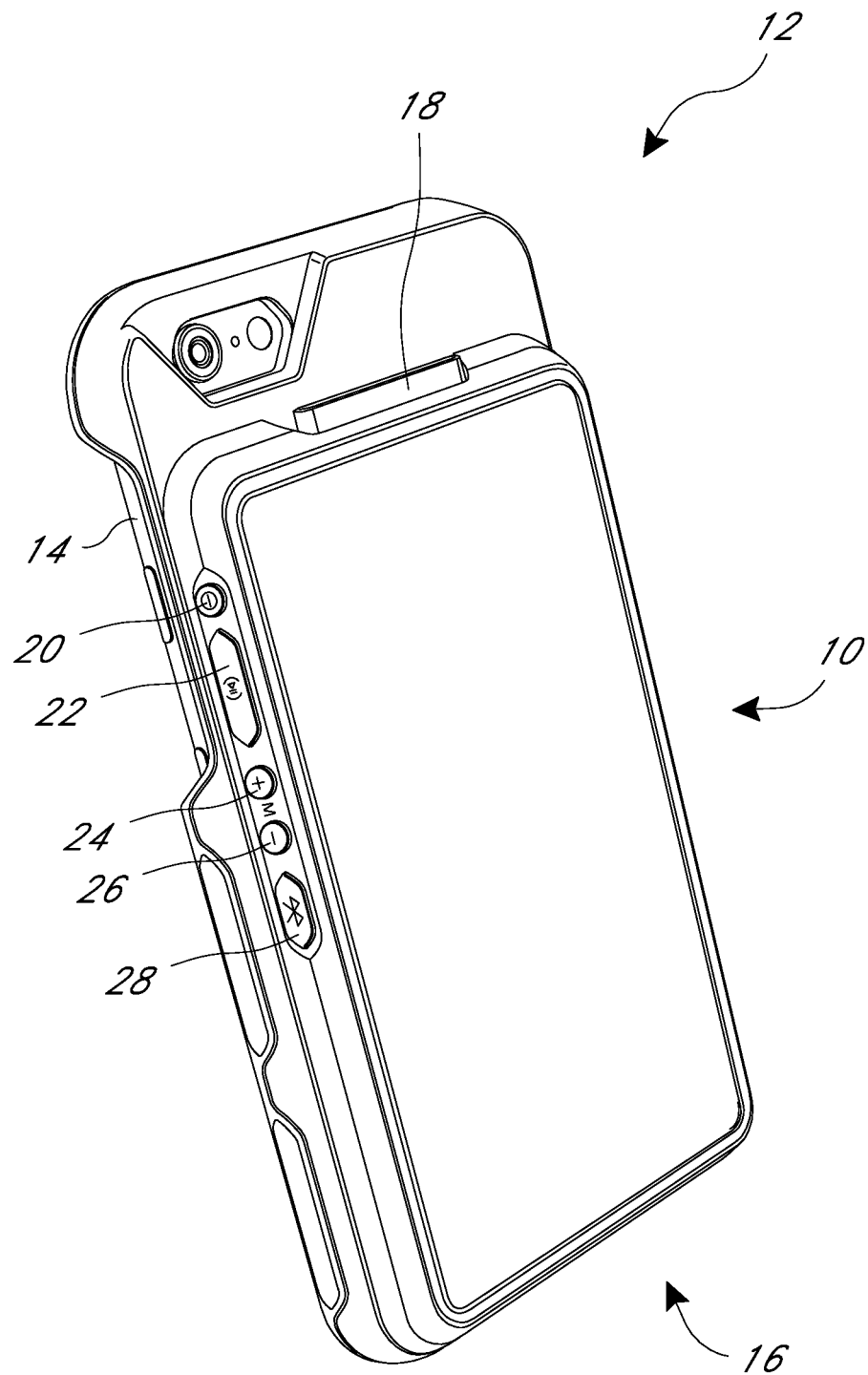
FIG. 5A illustrates a back isometric view of an embodiment of a speaker module coupled to an embodiment of a case for a mobile device.
Figure 5B:
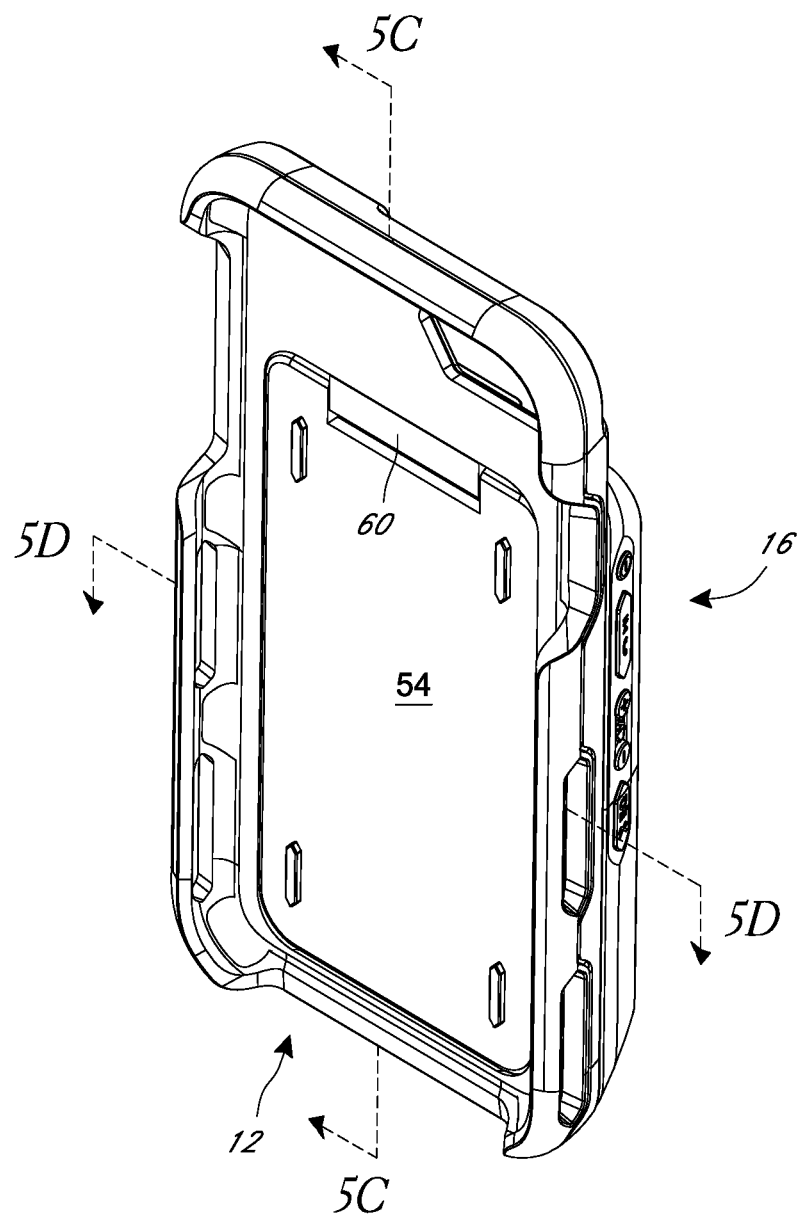
FIG. 5B illustrates a front isometric view of the speaker module coupled to the case for the mobile device.
Figure 5C:
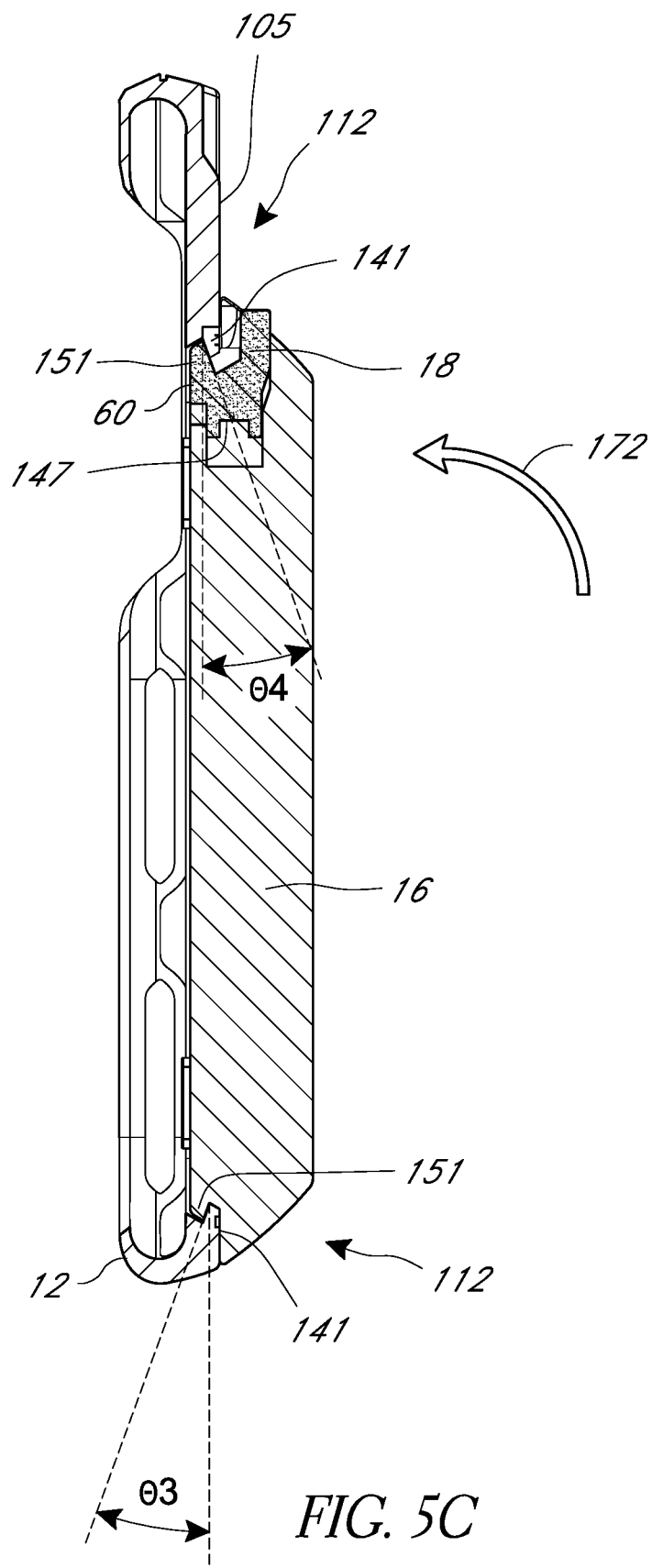
FIG. 5C is a longitudinal cross-section view of the speaker module coupled to the case for the mobile device.

In the illustrated embodiment, the case 12 includes a female or first connector 110 that is part of a mounting device or assembly 112 (see, for example, FIG. 5C). The female connector includes an opening, aperture, cutout, window, or hole 36 which extends through the back surface, panel, or wall 105. The opening 36 may be defined by a periphery or boundary 30 having a rim, ridge, ring, flange, protrusion, boss, etc. at a predetermined perimeter as discussed herein. As illustrated, for some embodiments, the opening 36 and the periphery 30 are generally rectangular, although other shapes are also possible. In some embodiments (not illustrated) the opening 36 may be replaced with a recess, depression, indentation, or cavity that extends partially into (but not through) the back surface 105 of the case 12.

The periphery 30 can include a top edge 131, a bottom edge 132, a right edge 133, and a left edge 134. In some embodiments, one or more of the top edge 131, the bottom edge 132, the right edge 133, and the left edge 134 include features for engagement a corresponding male connector on an additional device. In the illustrated embodiment, the top and bottom edges 131, 132 include flanges, protrusions, projections, bosses, knobs, or extensions 141 that at least partially form a rim, ridge, or ring and engage with corresponding features on a corresponding male connector as discussed herein (see, for example, FIG. 5C). The flanges 141 may comprise surfaces that are positioned at non-orthogonal angles with respect to the back side 105 of the case 12 as discussed herein (see, for example, FIG. 5C). The flanges 141 may be on top and bottom portions case 12 relative to the orientation illustrated in, for example, FIG. 1A.

Figure 5D:
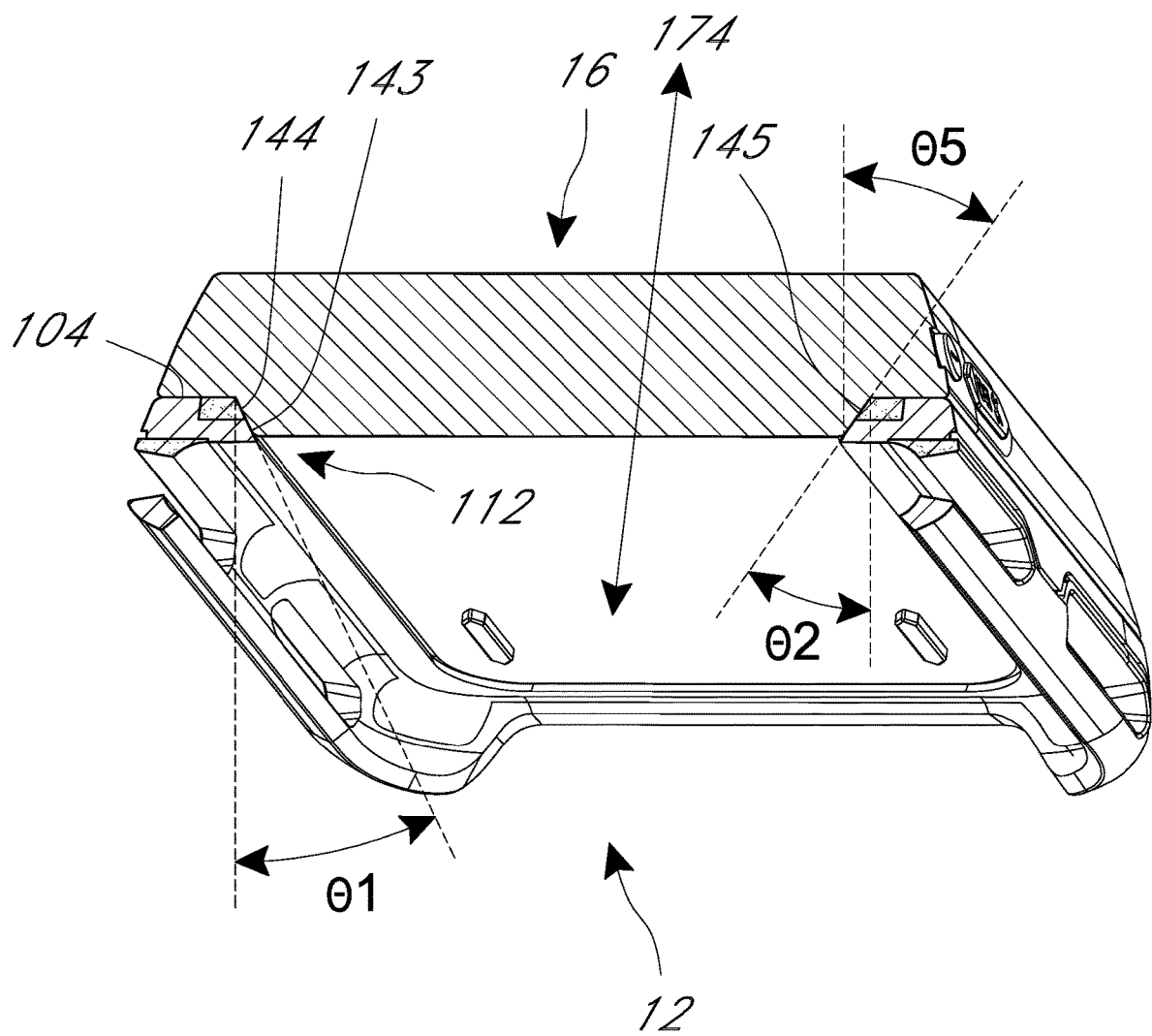

In the illustrated embodiment, the right and left edges 133, 134 of the periphery 30 include a first portion or surface 143 and a second portion or surface 144 that are part of the mounting device or assembly 112 (see, for example, FIG. 5D). The first portion 143 may be formed as a surface that extends orthogonally from an inside surface 115 of the case 12 towards the back side 105. The first portion 143 may be connected to the second portion 144 at a point between the inner surface 115 and the back side 105. The second portion 144 may extend from the back side 105 toward the inner surface 115. In the illustrated embodiment (see, for example, FIG. 5D), the first portion 143 extends at an angle θ1 relative to the back side 105. The angle θ1 of the first portion 143 may be non-orthogonal and configured such that the periphery 30 narrows from the back side 105 toward the inner surface 115 at the right and left edges 133, 134. The non-orthogonal angle θ1 of the first portion 143 may range from 1 to 60 degrees, including 5 to 45 degrees, and including 10 to 30 degrees, including the foregoing values and ranges bordering therein. In some embodiments, angle θ1 may be substantially 0 degrees such that the angle of the first portion 143 is substantially orthogonal relative to the back side 105. Thus, the first portion 143 may serve as a guiding surface for a corresponding male connector of an additional device or accessory (e.g., guiding of portion or surface 145 of the accessory). The accessory may be guided along the first portion 143 from the back side 105 toward the inner surface 115 in a desired direction. For example, if the accessory is placed off-center relative to the opening 36, the first portion 143 can guide the accessory to be generally centered between the right and left edges 133, 134. The angle θ1 may designed to provide sufficient and desirable sliding guidance of the accessory along the first portion 143, while also substantially inhibiting or preventing lateral movement (e.g., along the back side 105) once the accessory is engaged with the female connector 110. For example, the closer θ1 is to 0 degrees, the greater prevention of lateral movement and resistance to rotation, but less guidance along surface 145 is provided as discussed herein. Conversely, the greater θ1 is, the greater guidance along surface 145 is provided, but less prevention of lateral movement and resistance to rotation.

In the illustrated embodiment (see, for example, FIG. 5D), the second portion 144 extends at an angle θ2 relative to the back side 105. The non-orthogonal angle θ2 of the second portion 144 may be non-orthogonal and may be configured such that the periphery 30 narrows from the back side 105 toward the inner surface 115 at the right and left edges 133, 134. The non-orthogonal angle θ2 of the second portion 144 may range from 1 to 60 degrees, including 5 to 45 degrees, and including 10 to 30 degrees, including the foregoing values and ranges bordering therein. In some embodiments, angle θ2 may be substantially 0 degrees such that the angle of the second portion 144 is substantially orthogonal relative to the back side 105. Thus, the second portion 144 may serve as a guiding surface for a corresponding male connector of an additional device or accessory (e.g., guiding surface 145 of the accessory). The accessory may be guided along the second portion 144 from the back side 105 toward the inner surface 115 in a desired direction. For example, if the accessory is placed off-center relative to the opening 36, the second portion 144 can guide the accessory to be generally centered between the right and left edges 133, 134. The angle θ2 may designed to provide sufficient and desirable sliding guidance of the accessory along the second portion 144, while also substantially inhibiting or preventing lateral movement (e.g., along the back side 105) once the accessory is engaged with the female connector 110. For example, the closer θ2 is to 0 degrees, the greater prevention of lateral movement and resistance to rotation, but less guidance along surface 145 is provided as discussed herein. Conversely, the greater θ2 is, the greater guidance along surface 145 is provided, but less prevention of lateral movement and resistance to rotation.

As illustrated in FIG. 5D, angle 91 can be substantially equal to angle θ2 to help guide and position the accessory relative to the case 12 as discussed herein. The surface 145 may have an angle θ5 relative the planar surface of the back housing 54 (facing the mobile device) that corresponds to at least one of angle θ1 or angle 92.

The female connector 110 can be configured with a standardized size and shape, such that the female connector 110 is configured to selectively couple with similarly standardized male connectors on additional devices.

Figure 1D:
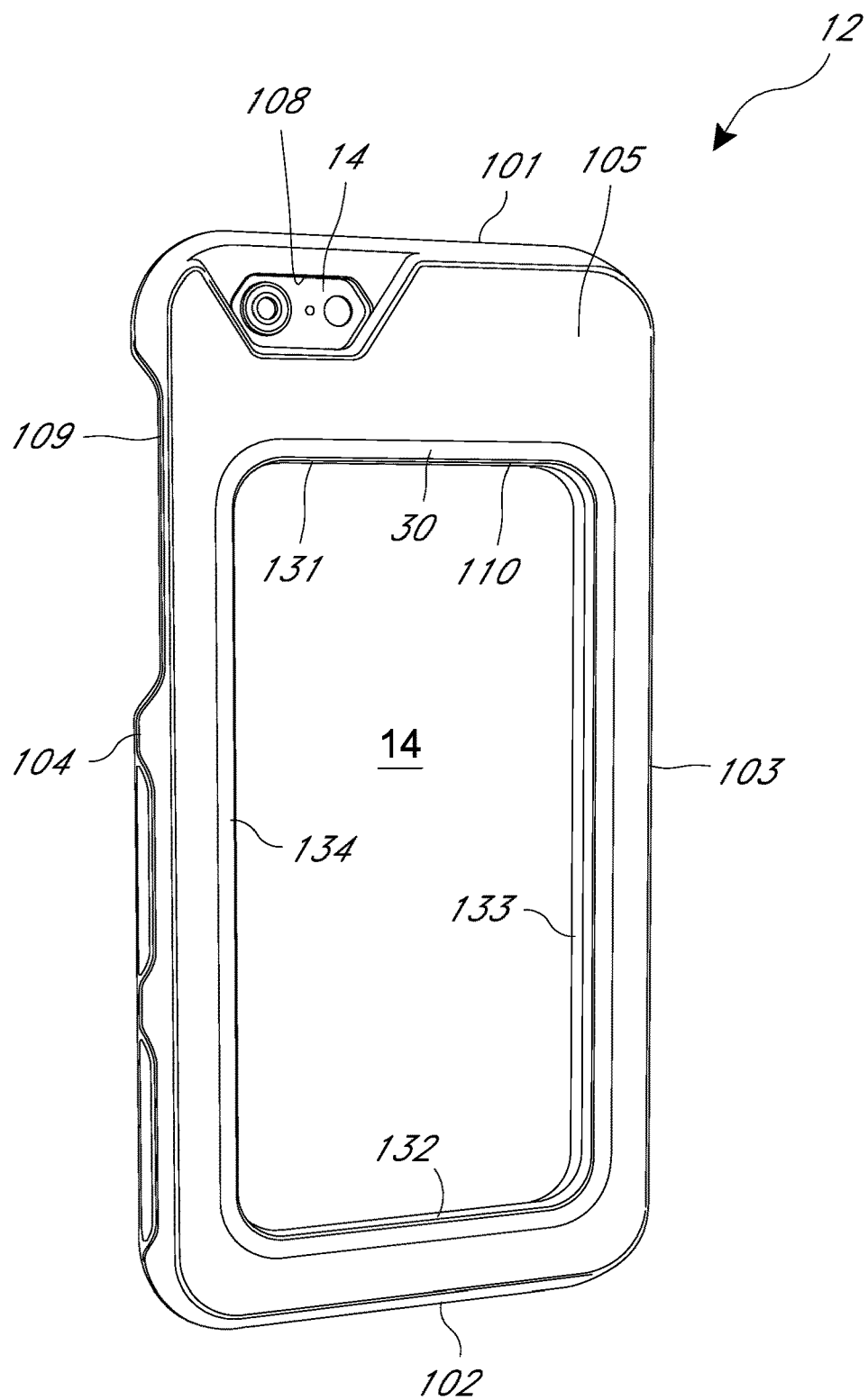
FIG. 1D is a back isometric view of the case of FIG. 1A installed on an embodiment of a mobile device.

FIG. 1D is a back isometric view of the case 12 installed on an embodiment of a mobile or portable device 14. In the illustrated embodiment, the mobile device 14 is a smartphone, such as the iPhone 7. As shown, a portion of the mobile device 14 is visible through the opening 36 and the opening 108. The mobile device 14 can be retained in the mobile device case 12 via various methods, such as a friction fit, flexible protrusions, a snap-fit, a slide fit, or any other method contemplated by one of skill in the art.

Figure 2A:
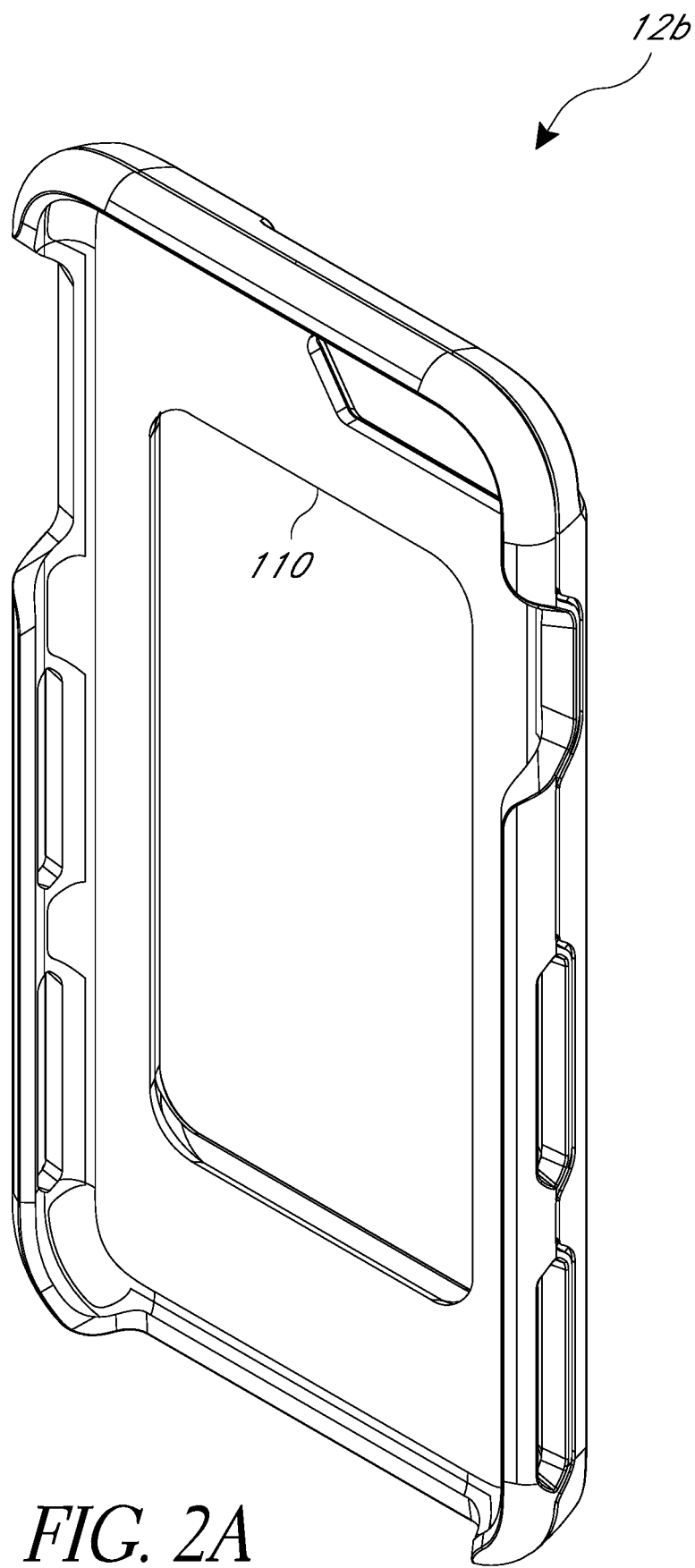
FIG. 2A illustrates a front isometric view of another embodiment of a case for a mobile device.
Figure 2B:
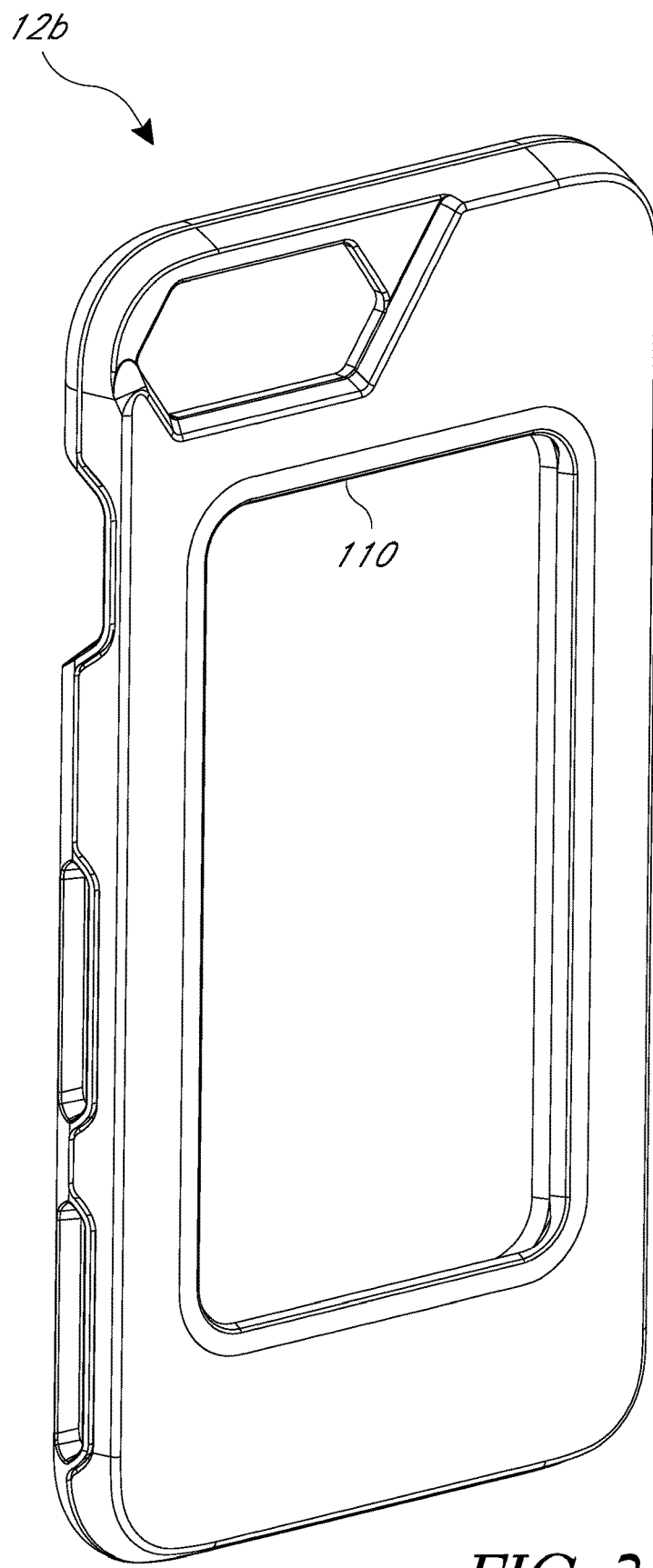
FIG. 2B is a back isometric view of the case of FIG. 2A.

FIGS. 2A and 2B illustrate a front and back isometric view of another embodiment of a case 12b for a mobile device. In many respects, the case 12b is similar to the case 12 previously described. For example, the case 12b includes a female connector 110 as previously described. In the illustrated embodiment, the case 12b is configured for use with an iPhone 7 Plus, and thus, the case 12b is larger than the case 12 previously described. Nonetheless, the connector 110 of the case 12b can be configured with a standardized shape and size, such that, although the case 12b is larger than the case 12, the connectors 110 of both cases 12, 12b are configured to couple to corresponding standardized male connectors.

Thus, FIGS. 2A and 2B are included to illustrate that, according to the principles of the present disclosure, while cases may be configured in different sizes and shapes to suit all manner of different mobile devices, the differently sized case may all include standardized female connectors 110 such that the differently sized cases are all configured to couple to devices that include corresponding standardized male engagements structures. Further, if the cases become obsolete (due to obsolescence of the mobile device for example), the standardized mounting device or assembly disclosed herein can allow for the various accessories to continue to be useful and used with new cases. Several example devices (that include corresponding standardized male engagements structures) are described in greater detail below. In some embodiments, the cases and other devices that include male and female standardized connectors are described as modular because the various devices can be advantageously coupled together in a wide variety of combinations as desired.

Figure 3A:
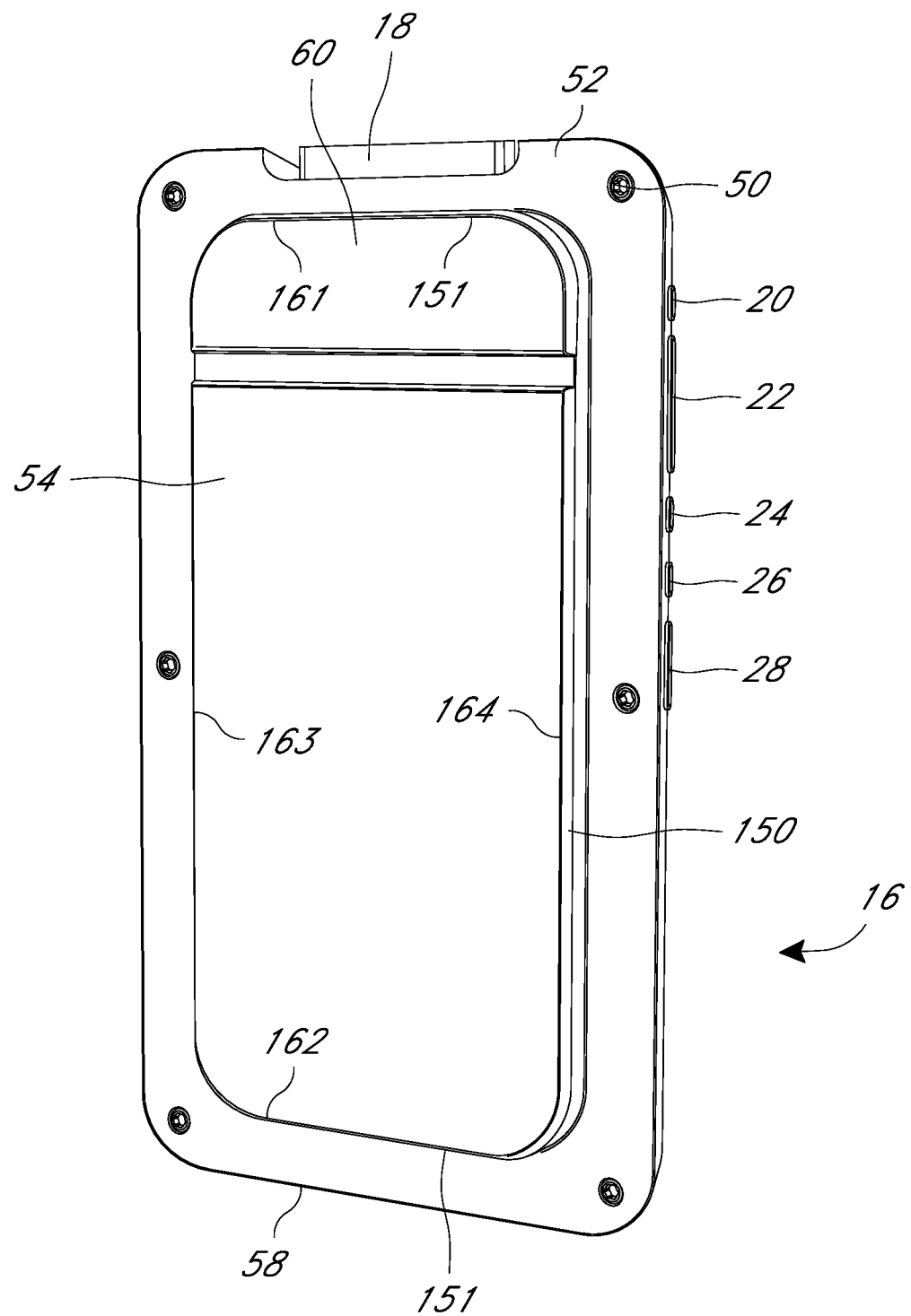
FIG. 3A illustrates a back isometric view of an embodiment of a speaker module.
Figure 3B:
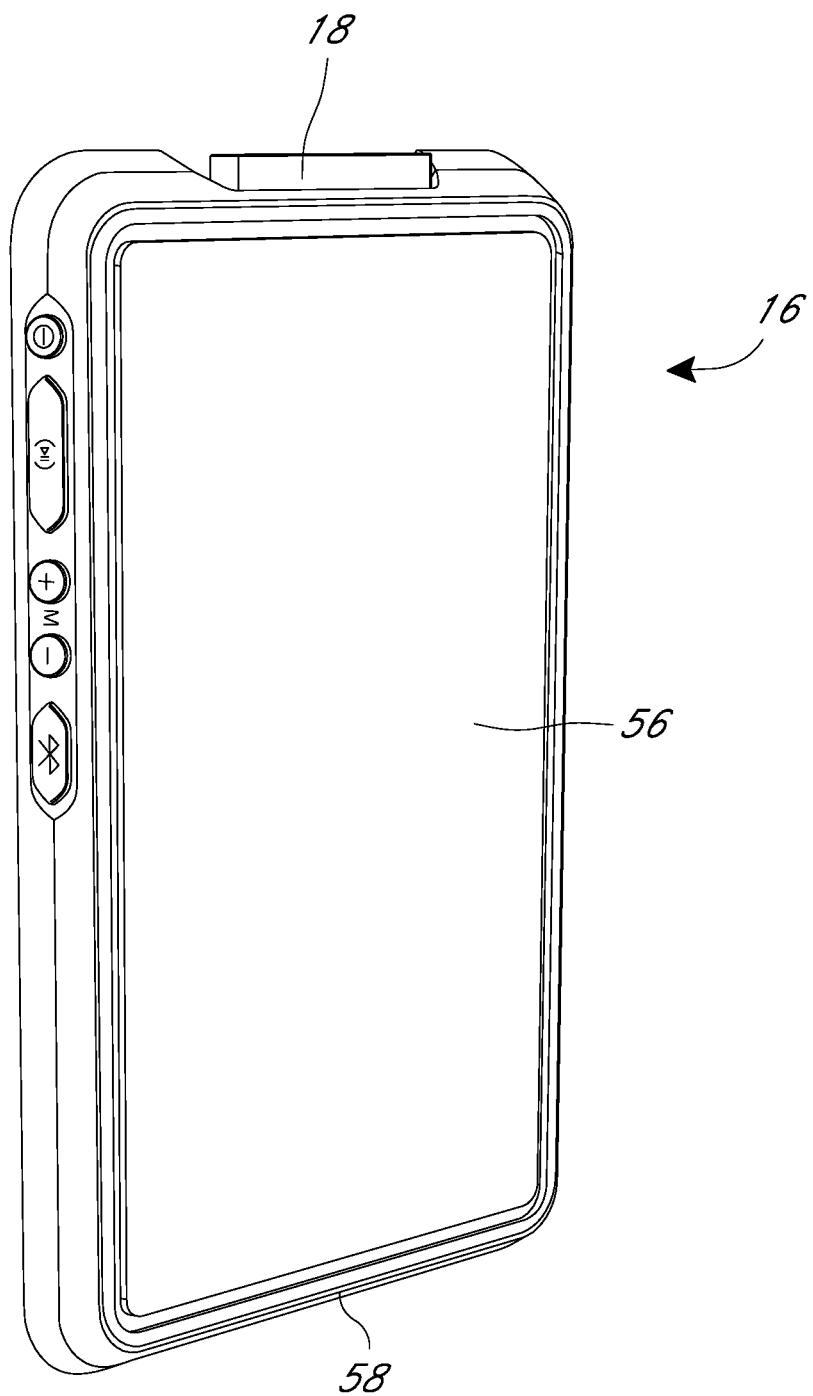
FIG. 3B is a front isometric view the speaker module of FIG. 3A.

FIGS. 3A and 3B illustrate back and front isometric views of an embodiment of a speaker module or another portable accessory 16, including accessories discussed herein, that includes a male or second connector 150 that is part of a mounting device or assembly 112 (see, for example, FIG. 5C). The speaker module ais an example embodiment of an accessory as discussed herein. The male connector 150 is configured to removably couple with the female connector 110, as discussed herein. In some embodiments, the speaker module 16 can be configured for two-way audio playing and recording/receiving audio). Thus, in some embodiments, the speaker module 16 can be a speaker and conference call module. The speaker module 16 can be considered an example embodiment of an accessory module that can engage with a case 12 as discussed herein.

The speaker module 16 can include a plurality of control buttons. Exemplary control buttons include a power button 20, a play/pause button 22, a minus button 26, a plus button 24 and an equalizer button/pairing 28. The minus and plus buttons 24, 26 may perform various functions, such as control volume, control playback, control equalization, or the like. In some embodiments, one or more of the buttons 20-28 may be formed from a translucent material, where an indicator, such as a light emitting diode (LED) may be disposed therebehind, providing one or more indications to a user, such as wireless link status, battery power status, or the like. Other control buttons may be present on the speaker and conference call module 16 as may be needed for a particular application, such as a mute button, separate playback track election buttons, or the like.

The male connector 150 of the speaker module 16 includes a protruding back casing or housing 54 (e.g., at least party forming an accessory mounting device) that extends outwardly from a main casing or housing 52. The back housing 54 can include a top edge 161, a bottom edge 162, a right edge 163, and a left edge 164. The back housing 54 may be configured in size and shape to correspond to the opening 36 of the female connector 110. The amount that the back housing 54 protrudes from the main housing 52 may be the same as or less than a depth of the back opening 36 of the female connector 110. Thus, the protruding back housing 54 can be configured to fit into the mobile device case 12 (as shown in FIGS. 5A and 5B). When the male connector 150 is coupled to the female connector 110, the main housing 52 may rest adjacent to the periphery 30 of the opening 36 (and substantially inhibit lateral movement as discussed herein). Moreover, the protruding design of the back housing 54 assists in placement of the speaker module 16 into the mobile device case 12 as discussed herein. As illustrated, for some embodiments, fasteners 50 may be used to hold the main housing 52 together. The fasteners 50 may be screws, as shown, or may be some other means for assembling the housing, as would be known in the art.

The speaker module 16 can be removed from the mobile device case 12 via an actuator, illustrated as a button or actuator 18, where depression of the button 18 allows the speaker module 16 to be readily separated from the mobile device case 12, as described in greater detail below. Other retention methods may be utilized provided that a user may readily, without tools, remove the conference call module 16 from the mobile device case 12, such as using one or more latches, clips, tabs, interlocks, etc. in addition to or instead of the button 18. The button 18 is actuable to couple and/or decouple the male connector 150 from the female connector 110. The button 18 may be resiliently depressed to move a fastener or slide portion 60 of the back housing 54. The slide portion 60 may slide downward (in the direction of the force applied to the button 18) when the button 18 is depressed to permit installation and removal of the speaker module 16 onto the mobile device case 12. The slide portion 60 may extend under the periphery 30 of the opening 36 to secure the speaker module 16 to the mobile device case 12.

In some embodiments, a portion of the top and/or bottom edges 161, 162 of the back portion 54 may include flanges 151 configured to overlap and engage with the flanges 141 of the female connector (see, for example, FIG. 5C) as part of the mounting device or assembly 112. As illustrated in FIGS. 3A and 4, the flange 151 of top edge may at least partially or wholly be formed from or be part of the slide portion 60. As illustrated in FIG. 3A, the flange 151 can extend substantially an entire extent or length of the slide portion 60 or top edge 161, which can correspond to an extent or length of the male connector 150. In some embodiments, the flanges 151 may also fit under the periphery 30 of the opening 36 to better secure the speaker module 16 to the mobile device case 12. A resiliency member, such as a leaf spring 70 (see FIG. 3C) may be disposed to keep the button 18 in an undepressed state and the slide portion 60 in its extended configuration, as shown in FIG. 5. Other resilient members or springs may be used to bias the button 18 and/or slide portion 60 toward an edge of the accessory to engage the corresponding flange 141 of the female connector 110. At least a portion of the flange 151 on the top edge 161 is positioned on the slide portion 60, such that when the button 18 is depressed, flange 151 on the top edge 161 is moved downwardly (by a user) to disengage from the flange 141 on the top edge 131 of the opening 36 of the female connector 110. In some embodiments, the button 18 and/or flanges 141, 151 may be provided on surfaces corresponding to surfaces 143, 144, 145 as discussed herein.

As shown in FIG. 3B, a front face 56 of the speaker module 16 can have exciters (described below) attached thereto to generate sound from the entirety of the front face 56. The front face may be formed from a woven carbon fiber, for example. The carbon fiber used in the front face 56 may be, for example, from about 0.5 to about 0.75 mm thick, typically about 0.67 mm thick. In some embodiments, the speaker module 16 includes one or more speakers. A microphone 58 may be disposed along an edge of the speaker module 16. While FIG. 3B shows the microphone 58 in a particular location, one or more microphones may be disposed at any location on the speaker module 16. In some implementations, the speaker module may include one or more dynamic loudspeaker drivers.

The speaker module 16 may be designed to be water resistant. In some embodiments, the speaker module 16 may have an IPX7 rating, for example. Thus, the microphone 58 may be a water resistant microphone. Similarly, the control buttons (elements 20 through 28) may be made with a water resistant cover, such as rubber, for example. The speaker module 16 may be sonically welded to be waterproof and constructed to have a desired integrity to be shock and/or drop proof. The speaker module 16 may have a gasket 57 that allows for the front face 56 to move to produce sound as discussed herein, while also providing shock and/or drop proof features as discussed herein.

Figure 3C:
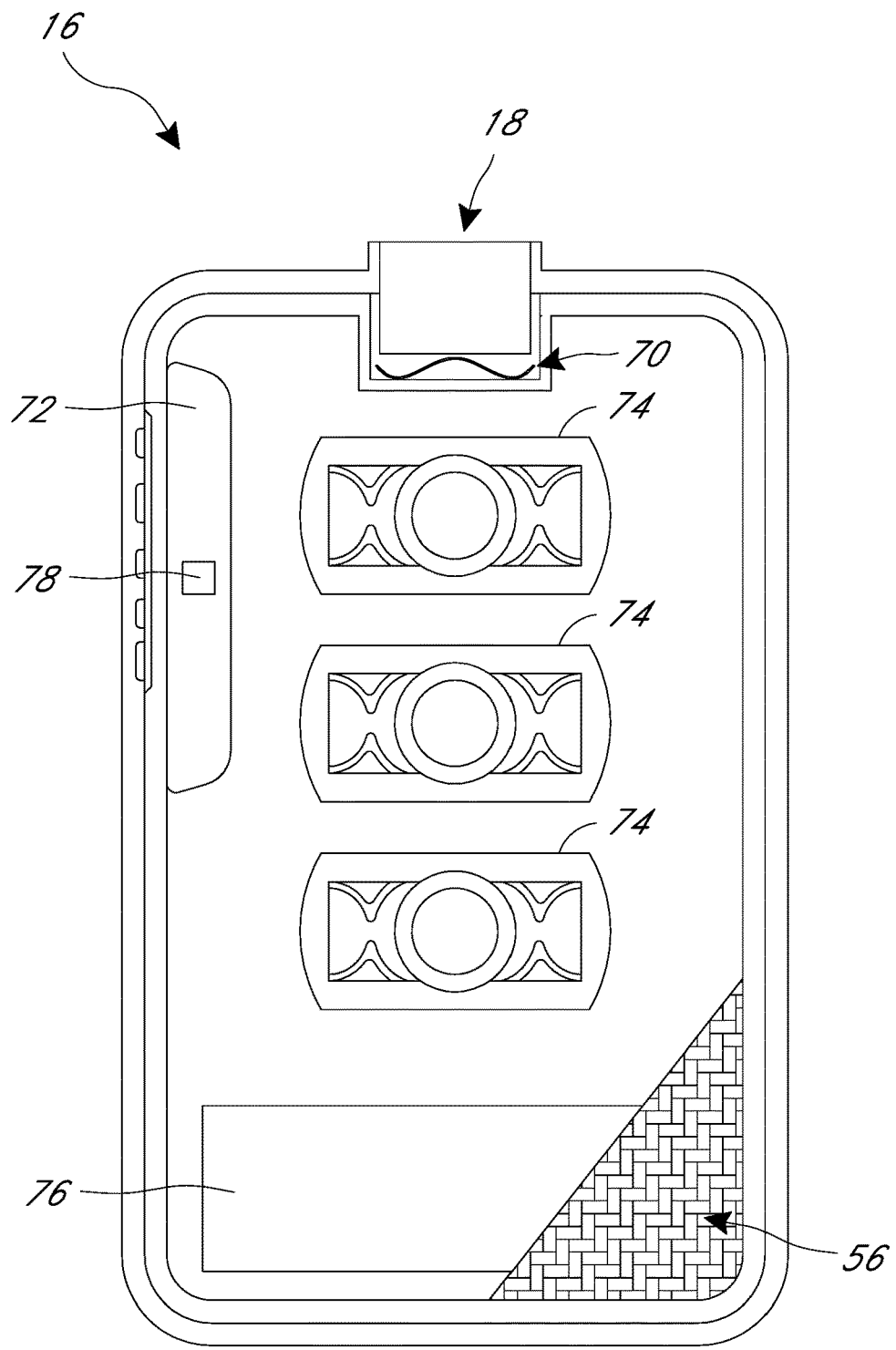
FIG. 3C is a partial cut-away front view of the speaker module of FIG. 3A, showing embodiments of certain internal components thereof, according to an embodiment.

FIG. 3C is a partially cut-away front view of the speaker module 16, showing embodiments of certain internal components thereof. As illustrated, a portion of the front face 56 is removed to show various internal components of the speaker module 16. While a specific configuration is shown in FIG. 3C, the components, as well as additional or fewer components, may be arranged in different configurations.

A circuit board 72 may be disposed within the speaker module 16 to receive input from the control buttons, receive an audio signal from a wireless transceiver 78, process the audio signal, and generate an output audio signal to one or more exciters 74, such as exciters. The circuit board 72 may contain components known in the art for an audio receiving and processing device, such as amplifiers, and the like. For example, a 2.5 W (minimum) by 2 channel amplifier may be used in some embodiments. The amplifier/audio path may include equalization components. For example, depressing the equalizer button 28 may change audio output modes. Various modes may be configured into the circuit board 72, such as an indoor setting, having a flat frequency response with as low of bass response as possible, or an outdoor setting, with priority to sound output level (SPL). The state of equalization (for example, whether in the indoor or outdoor mode) may be announced by the device, or another type of indicator may be used, such as a multi-color LED, for example. The circuit board 72 may include audio digital signal processing (DSP) with bass enhancing algorithms, for example.

The one or more exciters 74 may be chosen depending on the size of the mobile device case 12, for example. In some embodiments, the one or more exciters 74 may be a 5 W-rated, 13 mm voice coil dynamic driver mounted directly to an internal surface (such as back surface) of the front face 56, which can be made at least partially from carbon fiber as described herein. High quality, audio playback can be achieved as a result of the one or more exciters 74 vibrating of the front face 56. Stereo playback can be achieved with including two or more exciters 74.

The wireless transceiver 78 may be capable of receiving an audio signal from the mobile device 14 and also sending an audio signal from the microphone 58 to the mobile device 14. In some embodiments, the wireless transceiver 78 may be a Bluetooth 4.0+enhanced data rate (EDR) receiver that may support, for example, advanced audio distribution profile (A2DP), audio-video remote control profile (AVRCP), hands free profile (HFP), headset profile (HSP), however, other wireless communication protocols may be utilized in the conference call module 16 of some embodiments.

A battery 76 may provide power to the speaker and conference call module 16. The battery 76 may be a rechargeable battery, such as a polymer lithium-ion battery, for example. The battery 76 may be charged via a wired connection or wirelessly, such as using relatively large distance radio frequency charging (e.g., across a room or 8, 10, 15, 20, or more than 20 feet). For example, the battery 76 may be inductively charged or may be charged via a power port (not shown). When a power port is present, a port plug may be provided to maintain water resistant properties of the speaker and conference call module 16 when charging is not occurring.

In some embodiments, the speaker module 16 is designed with a width matching the width of the mobile device case 12. The thickness of the speaker module 16 may be, for example, from about 3 mm or less, about 5 mm, about 10 to about 20 mm, about 30 mm or more. For example, the thickness of the speaker module 16 can be about 11 mm. Such a thickness allows mounting on the mobile device case 12 without substantially increasing the overall size of the mobile device 14.

Although the illustrations in FIG. 3A-3C depict the button 18 positioned in the top portion of the speaker module 16, the button can alternatively or additionally positioned in the bottom, left, right portions and/or corner of the speaker module 16 according to some embodiments. In such embodiments, removable attachment of the speaker module 16 to a case can be accomplished using any of the approaches described herein.

Figure 4A:
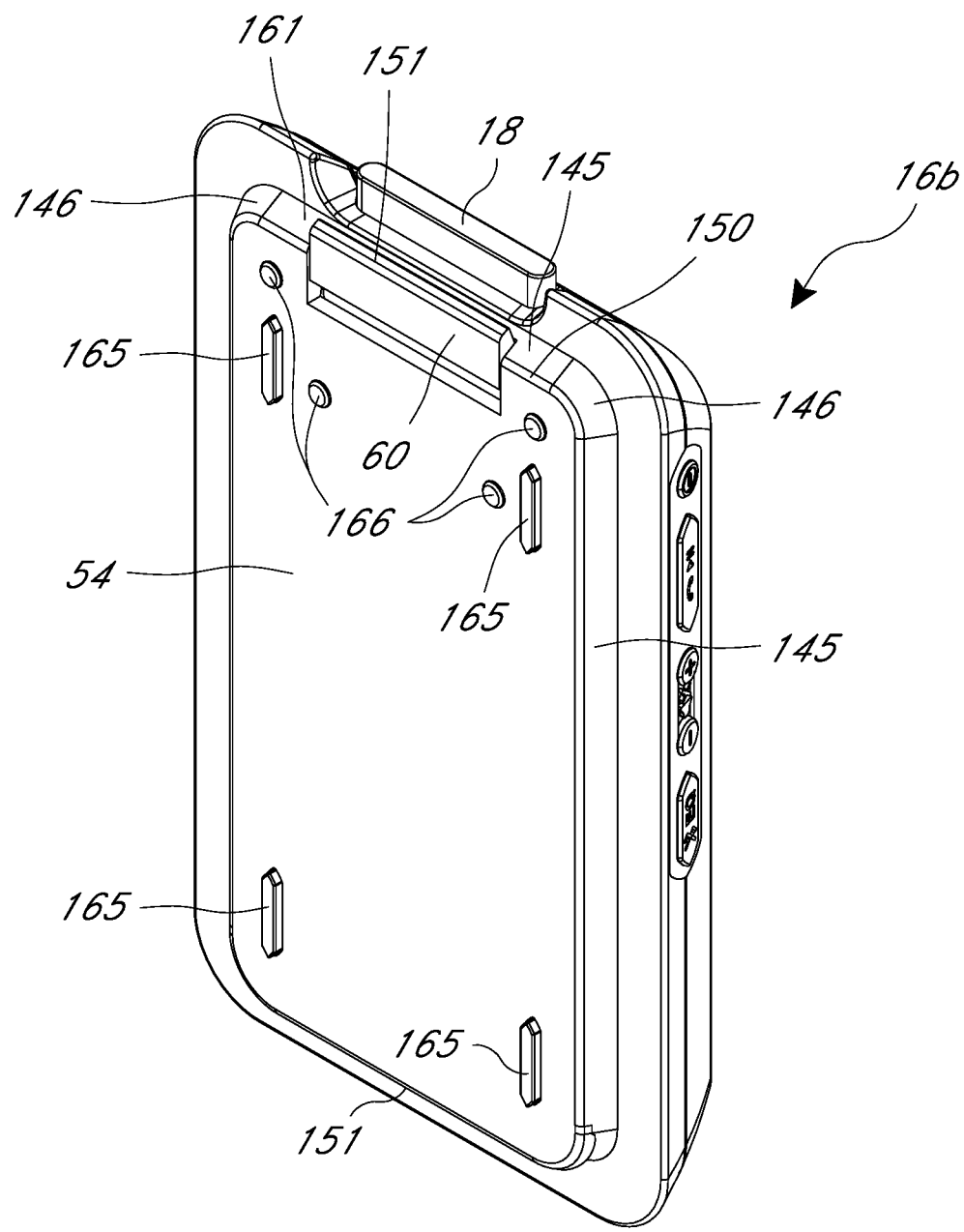
FIG. 4A illustrates a back isometric view of another embodiment of a speaker module.

FIG. 4A illustrates a back isometric view of another embodiment of a speaker module 16b that includes a male connector 150. The speaker module 16b is similar to the speaker module 16 described herein in many respects. As illustrated, the speaker module 16b includes a fastener or slide portion 60 that extends across a portion of the top edge 161 of the protruding back housing 54 (e.g., at least partly forming accessory mounting device). The slide portion 60 may extend a portion of the top edge 161 to clearance to insert the speaker module 16b into the opening 36. For example, surface(s) 145 may guide the male connector 150 into the opening 36 as discussed herein. As the male connector 150 slides into the opening, the male connector 150 may be fully rotationally aligned with corresponding shape of the 36 of the opening. Accordingly, the surface(s) 145, and including the surfaces 145 at the top edge 161 and at the corners 146 may help guide and rotate the male connector 150 into the desired/predetermine angular position relative the opening while the flanges 151 are retracted (positioned away) from the corners 146 to minimize interference and obstruction of the engagement of the male connector 150 to the female connector 110 (e.g., the flanges 151 abutting or being obstructed by surfaces 143, 144 of the female connector 110).

Additionally, the speaker module 16b can include feet 165 on the protruding back housing 54. The feet 165 may comprise rubber feet or any other suitable elastic, durable material. The feet 165 may be configured to space the speaker module 16 apart a small distance from the mobile device 14 to which is coupled to help dissipate heat. Further, the feet 165 can press against mobile device 14 and provide backwards force or pressure for the flanges 141, 151 to remain in contact to retain the accessory in a desired position relative to the case 12. At least as a result of the feet 165 pressing against the mobile device 14, the respective surfaces of the 141, 151 remain in tight engagement or contact once assembled.

As part of the design to make the speaker module 16b waterproof and shock proof as discussed herein, the speaker module 16b (and 16) can include charging pins 166 positioned, for example, in the back housing 54. The charging pins can be physically and electrically connected with a charging device 600 (see, for example, FIGS. 10A-C) or any other accessory/device to electrically communicate and provide power to the speaker module 16b. The charging pins 166 can negate the need for charging ports and further contribute to the waterproof and shock proof design of the speaker module. The charging pins 166 can protrude slightly from the surface of the back housing 54 while being waterproofed via a connection to the outer surface of the back housing 54.

Figure 4B:
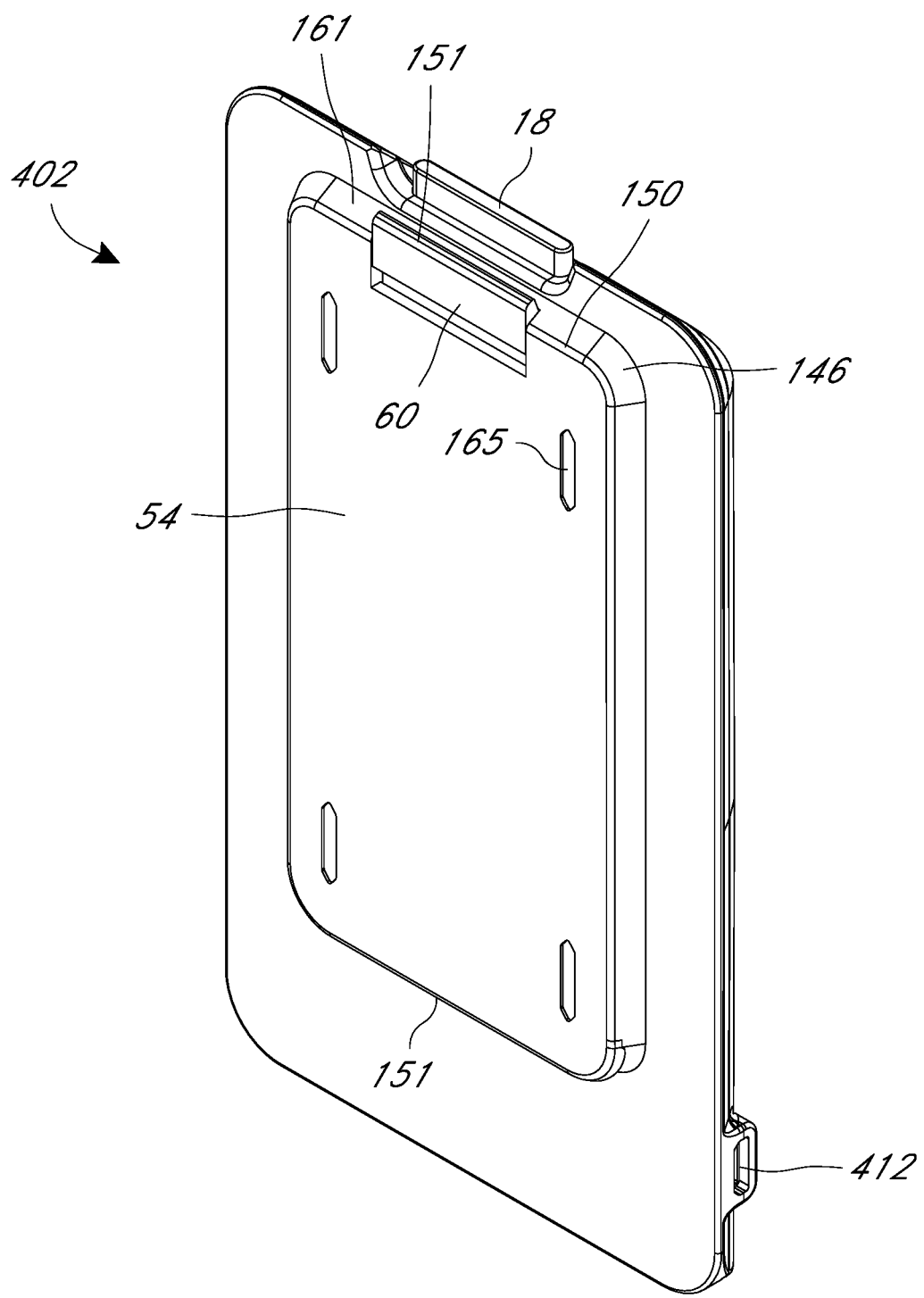
FIG. 4B illustrates a back isometric view of an embodiment of a charging device.
Figure 4C:
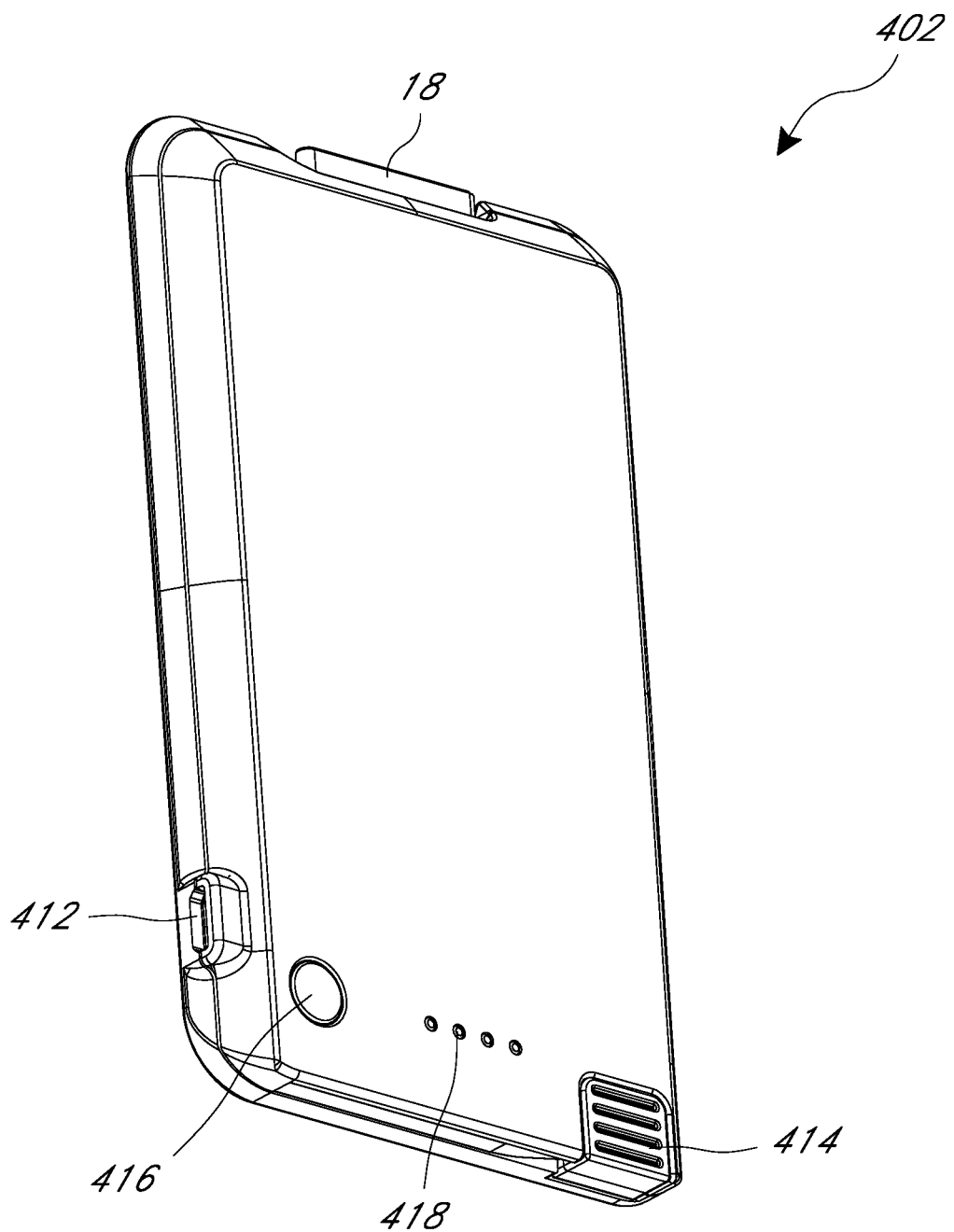
FIG. 4C illustrates a front isometric view of an embodiment of a charging device.

FIG. 4B illustrates a back isometric view of an embodiment of a charging device 402 (e.g., a battery pack accessory) that includes a male connector 150. FIG. 4C illustrates a front isometric view of an embodiment of the charging device 402. The charging device 402 can have any of the above features discussed for a speaker module 16, 16b. The charging device 402 can have a data/charging port 412 for providing electrical communication, powering, and charging the charging device 402 via, for example, USB. The charging device 402 can have a cable 414 that is configured to mate or engage a data/charging port of a mobile device 14, such as Lightning cable protocol. The charging device 402 can have a user interface that includes an input button 416 to turn on and off the charging device 402 or activate other desired functions as well as LED lights 418 for indicating, for example, a charge state and power on/off state of the charging device 402.

FIG. 5A illustrates a back isometric view of the speaker module 16 coupled to the case 12 for a mobile device 14 to form an accessory system or mounting assembly 10. FIG. 5B illustrates a front isometric view of the speaker module 16 coupled to the case 12 for the mobile device 14, illustrated with the mobile device 14 removed. FIG. 5C is a longitudinal or vertical cross-section view of the speaker module 16 coupled to the case 12 for the mobile device 14, illustrated with the mobile device 14 removed. FIG. 5D is a tangential or horizontal cross-section view of the speaker module 16 coupled to the case 12 for the mobile device 14, illustrated with the mobile device 14 removed. As shown in the cross-sectional views, when the speaker module 16 is coupled to the case 12, the flanges 141 of the female connector 110 overlap and engage with the flanges 151 of the male connector 150.

In some embodiments, to couple the male connector 150 to the female connector 110, the bottom flange 151 is inserted behind the bottom flange 141 and the speaker module 16 is pivoted (e.g., along pivot direction 172) such that the top flange 151 contacts the top flange 141. In some embodiments, the button 18 may be depressed to allow the top flange 151 to pass the top flange 141. The button 18 may move within an opening, cavity, and/or cutout in the accessory 16, The wall of the opening of the accessory may guide the button 18 and/or flange 151 as discussed herein. As illustrated in FIG. 5C, the button 18 and flange 141 may be formed from a monolithic piece of material. The button 18 may have an opening and/or cutout 147 to, for example, engage an elastic component or spring, such as the leaf spring 70 as discussed herein. In some embodiments, the force of the pushing the speaker module 16 toward the case 12 overcomes the force of the leaf spring 70, allowing the slide portion 60 to move down to allow the top flange 151 to pass the top flange 141, Distal portions of the top flanges 141, 1:51 can be beveled, chamfered, rounded, or angled to facilitate coupling as illustrated. Once the top flange 151 has passed the top flange 141, the resiliency member forces the slide portion 60 up so that to position and retain the top flange 141 behind the top flange 151. The button 18 can be depressed to lower the slide portion 60 such that the male connector 150 can be decoupled from the female connector 110.

As shown in FIG. 5C, the flanges 141 extends at an angle θ3 relative to the back side 105, The angle θ3 of the flange 141 may be non-orthogonal and may be configured such that a surface of the flange 141 extends toward the back side 105 to provide an angled engagement surface of the flange 151. The non-orthogonal angle θ3 of the flange 141 may range from 1 to 60 degrees, including 5 to 45 degrees, and including 10 to 30 degrees, including the foregoing values and ranges bordering therein. In some embodiments, angle θ3 may be substantially 0 degrees such that the angle of the flange 141 is substantially parallel relative to the back side 105. The angle θ3 may designed to provide sufficient and desirable sliding guidance of the flange 151 along the flange 141, while also substantially inhibiting or preventing movement of the flange 151 away from the flange 141 once the accessory is engaged with the female connector.

As shown in FIG. 5C, the flanges 151 extends at an angle θ4 relative to a surface back housing 54 (e.g., that will face the mobile device 12). The angle θ4 of the flange 151 may be non-orthogonal and may be configured such that a surface of the flange 151 extends toward the surface of the back housing 54 to provide an angled engagement surface of the flange 151. The non-orthogonal angle θ4 of the flange 151 may range from 1 to 60 degrees, including 5 to 45 degrees, and including 10 to 30 degrees, including the foregoing values and ranges bordering therein. In some embodiments, angle 94 may be substantially 0 degrees such that the angle of the flange 151 is substantially parallel relative to the surface of the back housing 54. The angle θ4 may designed to provide sufficient and desirable sliding guidance of the flange 151 along the flange 141, while also substantially inhibiting or preventing movement of the flange 151 away from the flange 141 once the accessory is engaged with the female connector. As illustrated in FIG. 5C, angle θ3 can be substantially equal to angle θ4 to help guide and position the accessory relative to the case 12 as discussed herein and provide a flush contact between the surfaces of the flanges 141, 151.

Once the mounting device or assembly 112 is engaged or assembled as discussed herein (e.g., along engagement and disengagement direction 174), the connection between the female connector 112 and the male connector can retain the accessory relative to the case 12, while substantially preventing or inhibiting rotation of the accessory relative to the case 12. For example, surfaces 145 of the back housing 54 can substantially flush with the surfaces of the first and second portions 143, 144 to inhibit rotation while the flanges 141, 151 retain the connection between the female and male connector 110, 150 as discussed herein. Accordingly, the mounting device or assembly 112 provides a mounting mechanism that guides the male connector 150 into the female connector 110 while inhibiting rotation and disengagement of the male connector 150 and female connector 110 until desired (e.g., by depressing button 18).

In some embodiments, in lieu of or provided with the flanges 141, 151, the female and male connectors 110, 150 may be mated or engaged using one or more fasteners such as a rotating switch or pin to secure and retain the female and male connectors 110, 150. For example, once the female and male connectors 110, 150 are positioned in desired/predetermined positions with respect to each other, a user may rotate a switch or latch that (further) secures the connection between the female and male connectors 110, 150. In some embodiments, in lieu of or provided with the flanges 141, 151, the female and male connectors 110, 150 may be mated or engaged using on or more magnets or reusable adhesives provided on corresponding portions of the female and male connectors 110, 150.

Disclosed herein is a mounting device or assembly 112 that can include a female connector 110 and a male connector 150. The female connector 110 and/or male connector 150 can include at least one flange 141, 151 that facilitates retaining and engagement of the female connector 110 and the male connector 150. The female connector 110 and/or male connector 150 can include at least one surface 143, 144, 145 that facilitate guiding the male connector 150 into the female connector. 110 The at least one surface can facilitate orienting the male connector 150 relative to the female connector 110 and substantially inhibit rotation of the male connector 150 relative to the female connector 110.

While the above description has focused primarily on coupling the speaker module 16 to a mobile device case 12 the male connector 150 can also be used to couple the speaker module 16 to other modular devices and accessories described below. Similarly, the female connector 110 on the case 12 can also be used to couple the case to other modular devices and accessories.

Figure 6A:
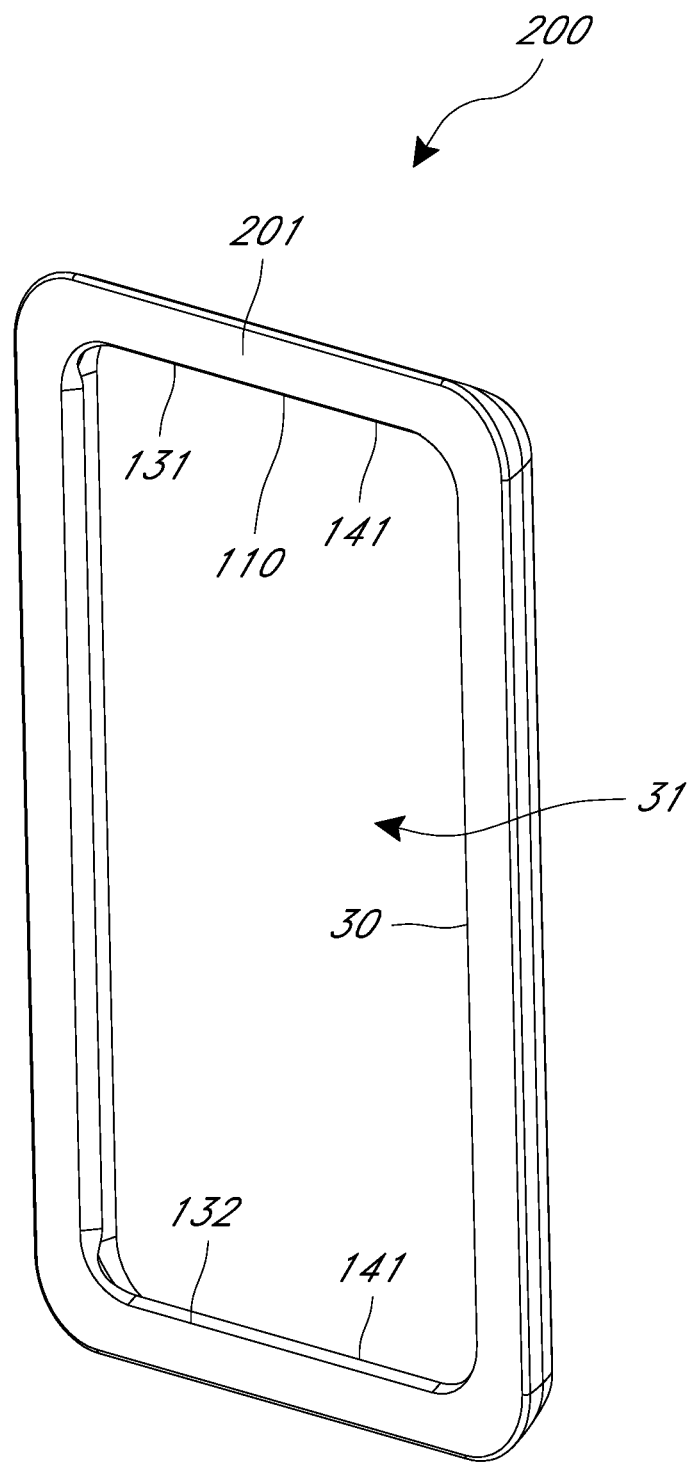
FIG. 6A illustrates a front isometric view of an embodiment of a mounting plate.

FIG. 6A illustrates a front isometric view of an embodiment of a mounting plate 200 with a female connector 110. The female connector 110 can be configured as described herein, except, as illustrated, it does not extend entirely through the mounting plate 200. That is, instead of including the opening 36, the female connector 110 of the mounting plate 200 includes a recess 31 extending into a front face 201 of the mounting plate 200.

The recess 37 includes the periphery 30 as described herein, including, for example flanges 141 on the top and bottom edges 131, 132. The recess 31 is configured to receive the protruding back housing 54 of a male connector 150 as described herein. When the male connector 150 is coupled to the female connector 110, the flanges 151 are positioned behind the flanges 141 as previously described to couple the two devices together.

Figure 6B:
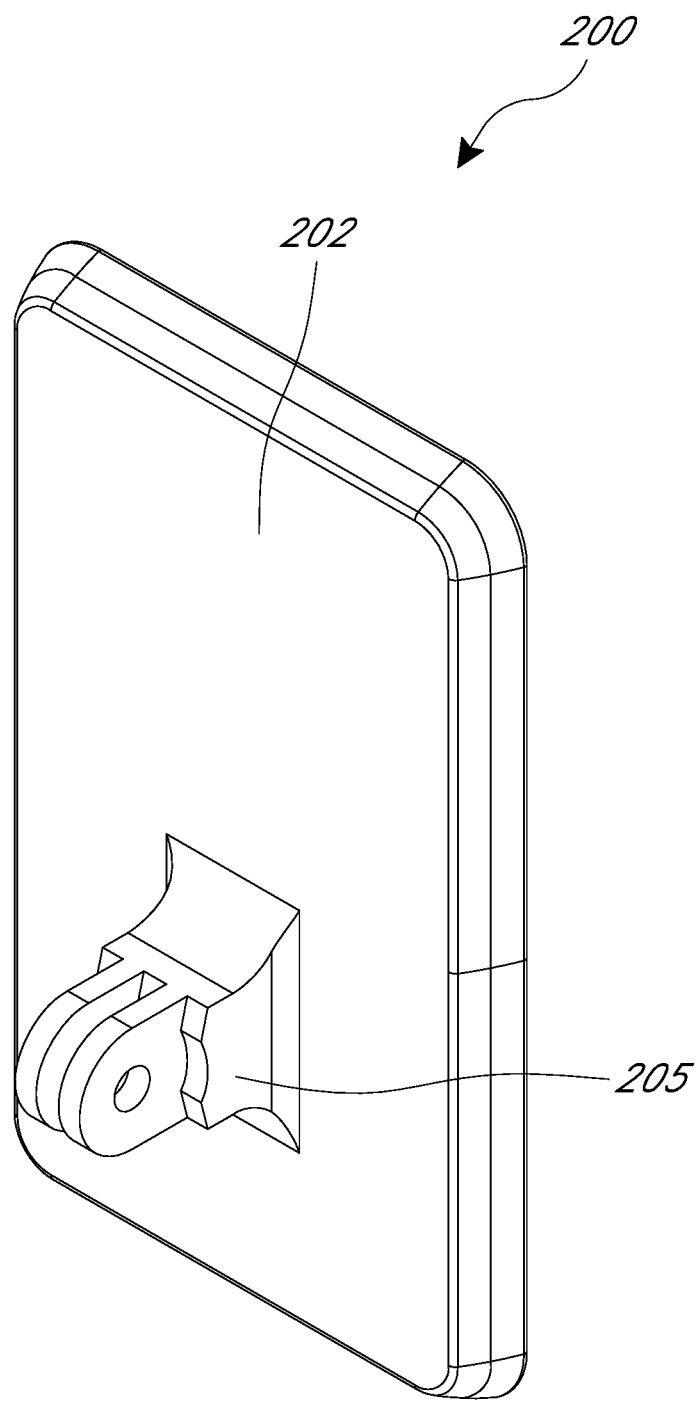
FIG. 6B is a back view of the mounting plate of FIG. 6A.

FIG. 6B is a back view of the mounting plate 200. As illustrated, a mounting bracket 205 extends from a back surface 202 of the mounting plate 200. The mounting bracket 205 is configured to engage a corresponding bracket such that the mounting plate can be mounted or attached to various other objects, such as handlebars, for example. Although a specific configuration and placement of the mounting bracket 205 is illustrated in FIG. 6B, other configurations and placements for the mounting bracket 205 are possible.

Figure 6C:
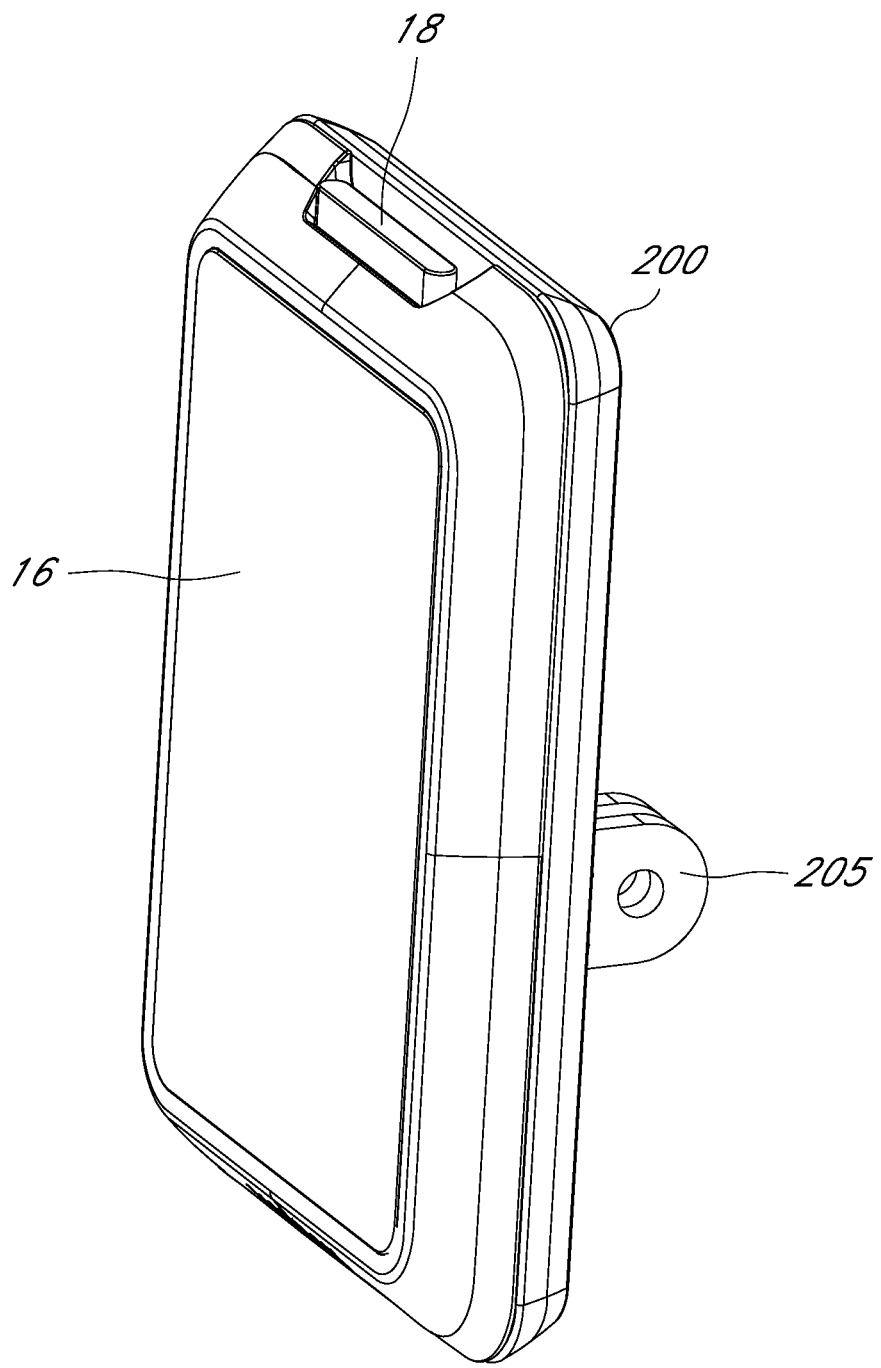
FIG. 6C is an isometric view of the speaker module of FIG. 3A coupled to the mounting plate of FIG. 6A.

FIG. 6C is an isometric view of the speaker module 16 coupled to the mounting plate of 200. The male connector 150 of the speaker module 16 is engaged with the female connector 110 of the mounting plate 200. Thus, the mounting plate 200 permits the speaker module 16 to be mounted to various other objects, like handlebars. The button 18 can be depressed to decouple the speaker module 16 from the mounting plate 200.

Figure 7A:
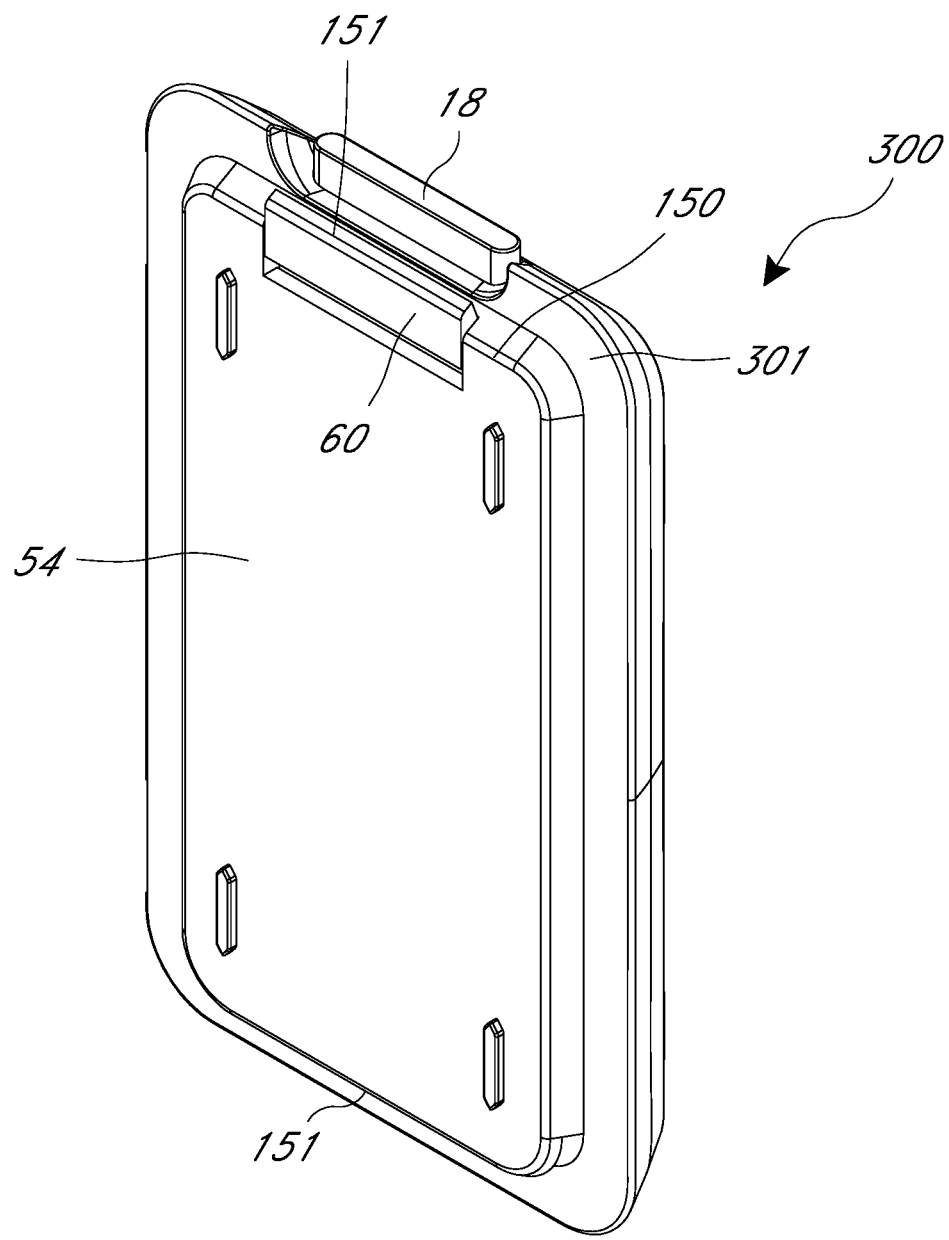
FIG. 7A illustrates a front isometric view of an embodiment of a mounting plate.

FIG. 7A illustrates a front isometric view of an embodiment of a mounting plate 300 (an example accessory) with a male connector 150 positioned on a front surface 301 thereof. The male engagement portion can be located on a front side of the mounting plate 300, The male connector 150 can be configured as described herein, including the protruding back housing 54, the button 18, the slide portion 60, and the flanges 151, which can be considered to be positioned on a housing of the mounting plate 300.

Figure 7B:
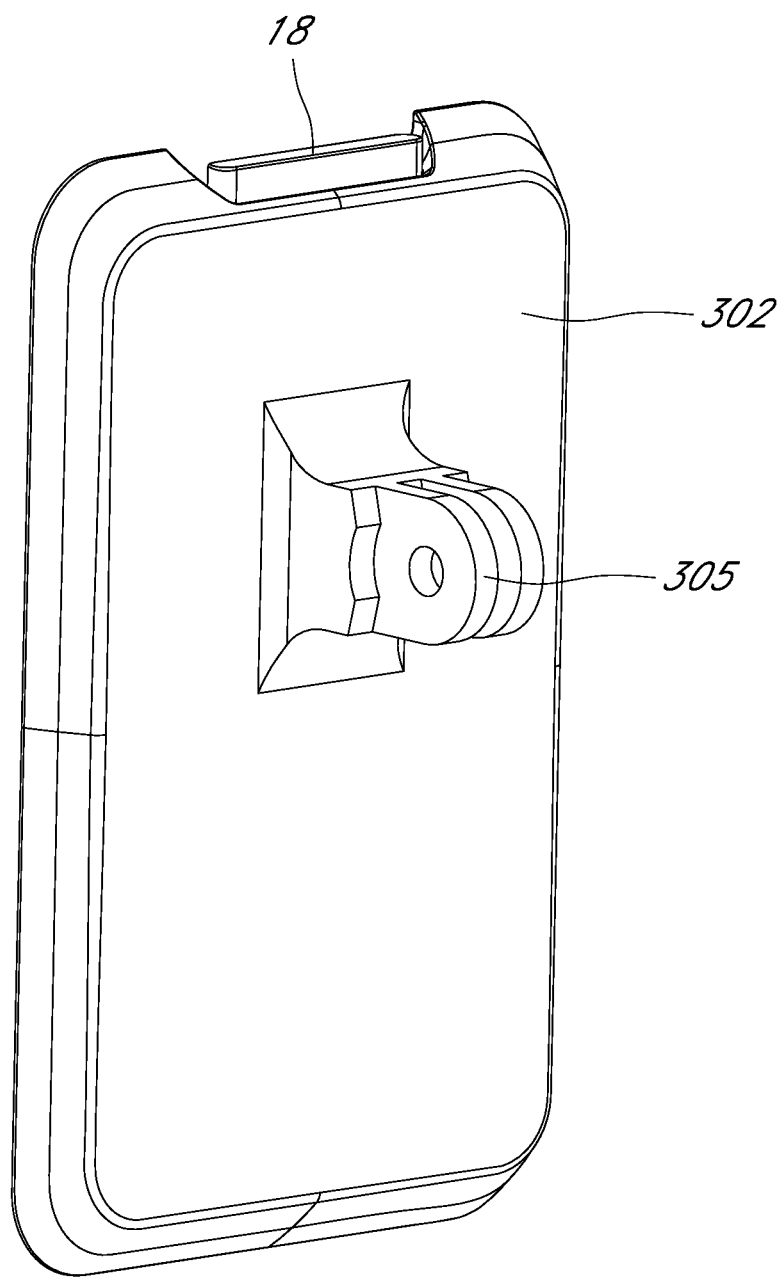
FIG. 7B is a back isometric view of the mounting plate of FIG. 7A.

FIG. 7B is a back isometric view of the mounting plate 300. The mounting plate 300 includes a mounting bracket 305 on the back surface 302 thereof. The mounting bracket 305 is configured to engage a corresponding bracket such that the mounting plate can be mounted or attached to various other objects, such as handlebars, for example. Although a specific configuration and placement of the mounting bracket 305 is illustrated in FIG. 7B, other configurations and placements for the mounting bracket 305 are possible. The mounting plate 300 may also include or be a speaker module 16, 16*b* as discussed herein and in particular, in reference to FIGS. 3 and 4A, and include any of the features of the speaker module 16, 16*b*. The mounting plate 300 may also include or be a charging device 402 as discussed herein, and in particular, in reference to FIGS. 4B and C, and include any of the features of the charging device 402.

Figure 7C:
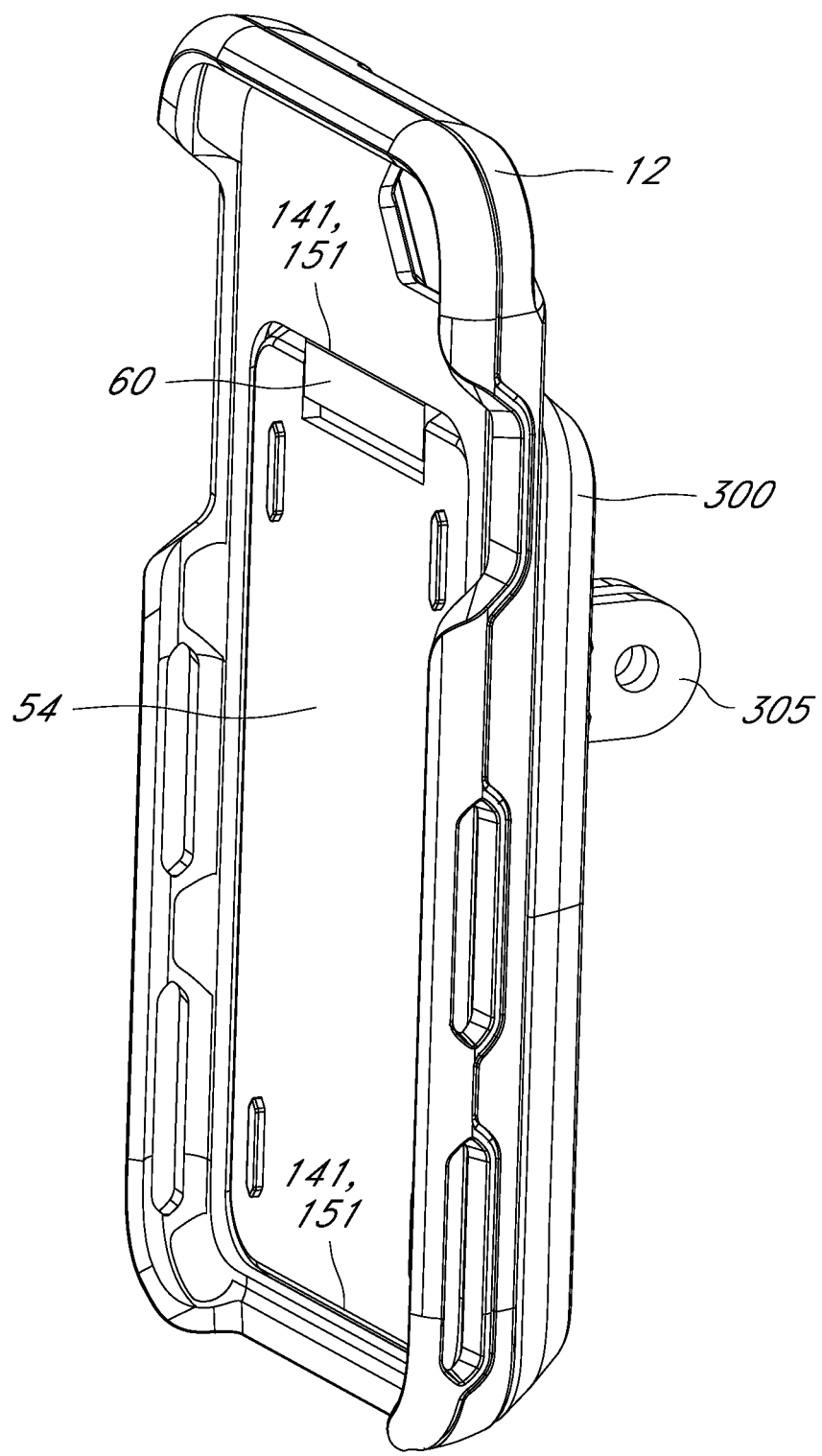
FIG. 7C is an isometric view of the case for a mobile device of FIG. 1A coupled to the mounting plate of FIG. 7A.

FIG. 7C is an isometric view of the case 12 for a mobile device 14 (the mobile device 14 is not illustrated in FIG. 7C) coupled to the mounting plate 300. The male connector 150 of the mounting plate 300 is engaged with the female connector 110 of the case 12, Thus, the mounting plate 300 permits the case 12 to be mounted to various other objects, like handlebars. The button 18 can be depressed to decouple the case 12 from the mounting plate 300.

In some embodiments, both mounting plates 200, 300 can be used. For example, a user may couple the speaker module 16 to the mounting plate 200 and couple the case 12 to the mounting plate 300. Thus, both the speaker module 16 and the case 12 can be attached to other objects, like handlebars. If desired, the user may decouple the speaker module 16 from the mounting plate 200, decouple the case 12 from the mounting plate 300, and then couple the speaker module 16 to the case 12. As shown, the modular female and male connectors 110, 150 permit the various devices to be coupled together in a wide variety of configurations.

Figure 8A:
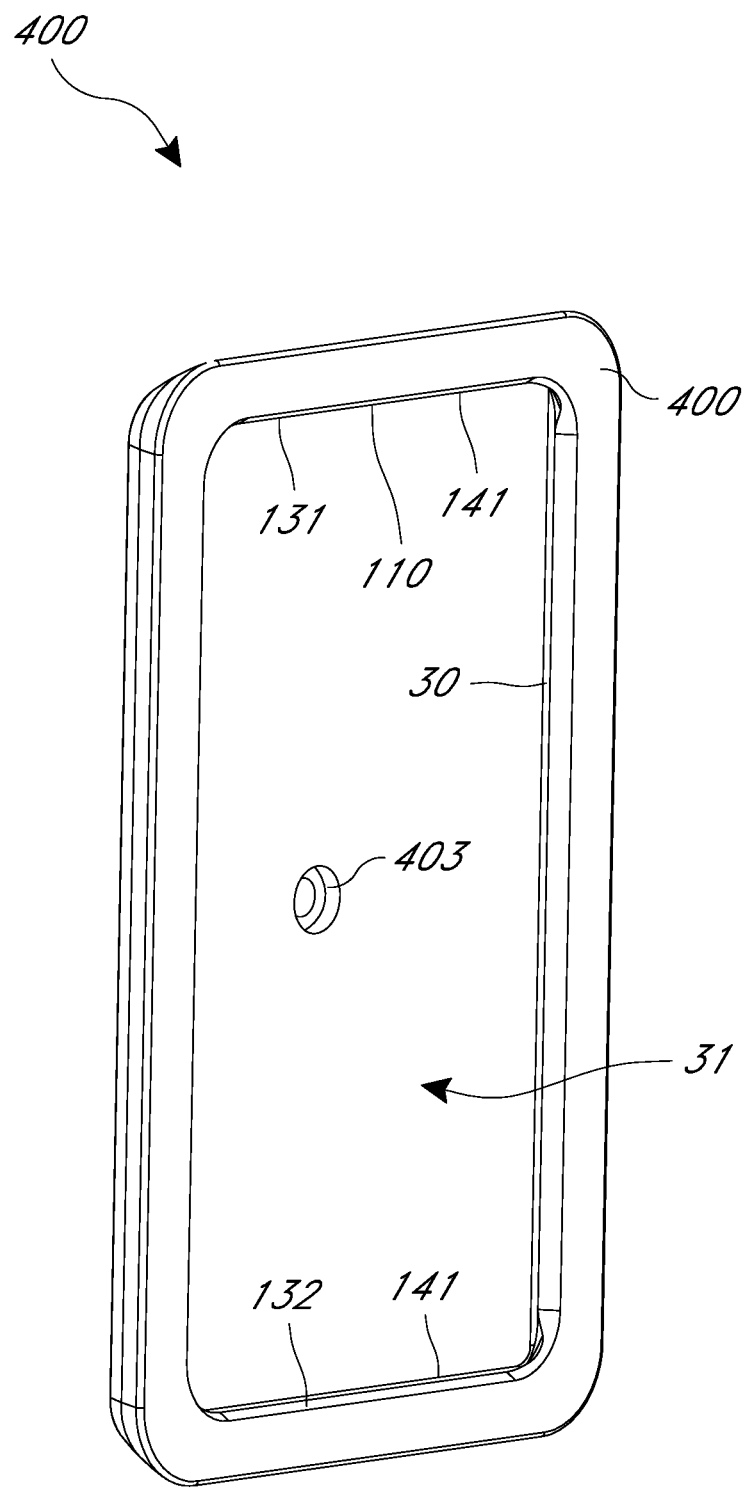
FIG. 8A illustrates an isometric view of another embodiment of a mounting plate.

FIG. 8A illustrates an isometric view of another embodiment of a mounting plate 400 with a female connector 110. The mounting plate 400 is configured to attach to a clip, such as a belt clip. Similar to the mounting plate 200 described herein, the female connector 110 includes a recess 31 formed in the front surface 401 thereof. The recess 31 includes the periphery 30 as described herein, including, for example flanges 141 on the top and bottom edges 131, 132. The recess 31 is configured to receive the protruding back housing 54 of a male connector 150 as described herein. When the male connector 150 is coupled to the female connector 110, the flanges 151 are positioned behind the flanges 141 as previously described to couple the two devices together. Additionally, the mounting plate 400 includes a hole 403 extending therethrough.

Figure 8B:
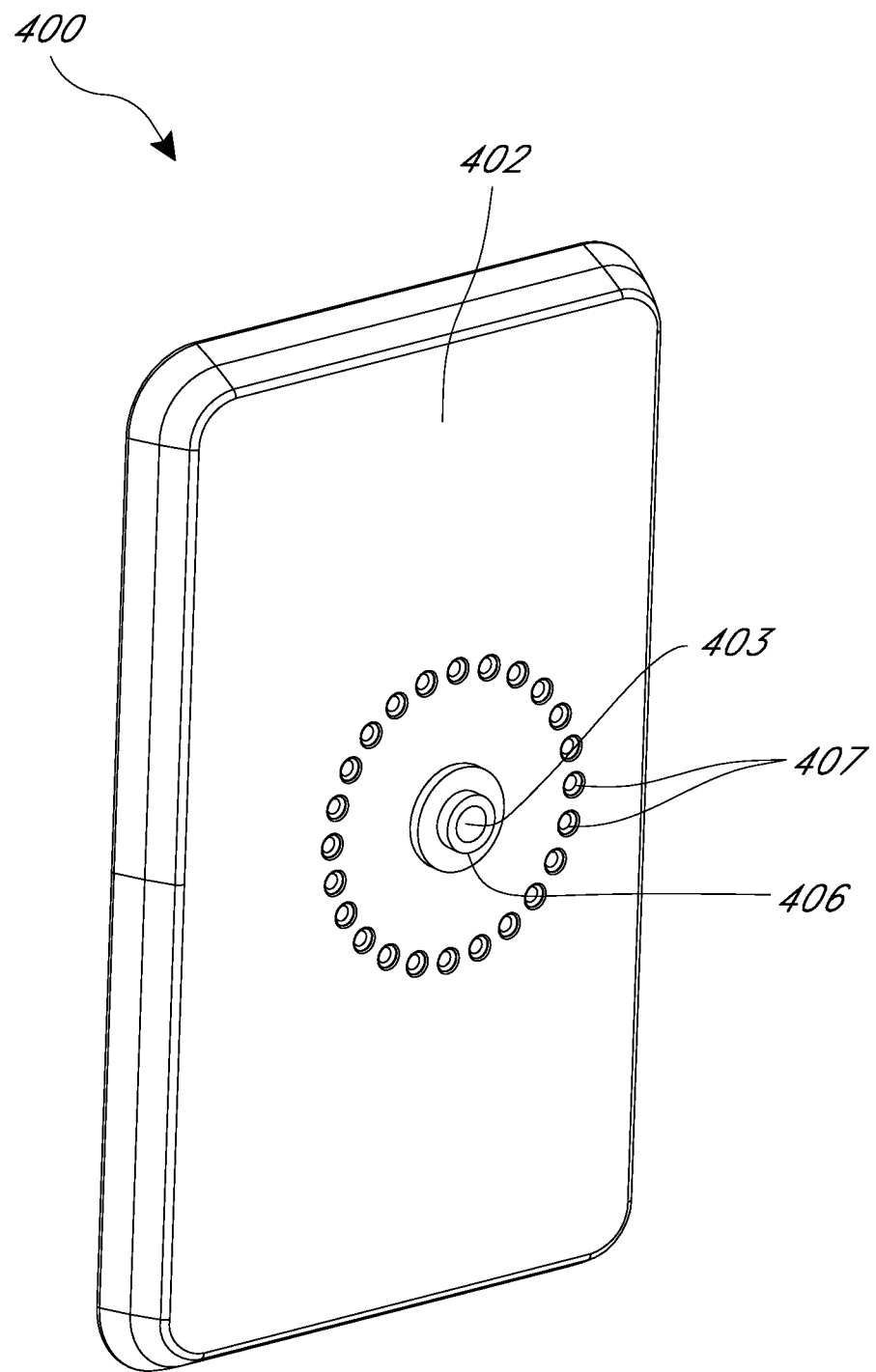
FIG. 8B is a back isometric view of the mounting plate of FIG. 8A.

FIG. 8B is a back isometric view of the mounting plate of 400. As shown, the hole 403 extends through the mounting plate 400. On the back surface of the device 402, the mounting plate also includes an annular protrusion 406 surrounding the hole 403. On the back surface, the hole 403, and the annular protrusion 406 are surrounded by a plurality of indentations 407. In the illustrated embodiment, the indentations 407 are arranged in a circle although other arrangements are possible. In some embodiments, the hole 403, annular protrusion 406, indentations 407 are configured to engage a clip, such that the mounting plate 400 can be attached to the clip. Indentations 407 can be used as reference to position the clip. In some embodiments, the clip is a spring-loaded clip, visor clip, backpack clip, clothing clip, belt clip, etc.

Figure 8C:
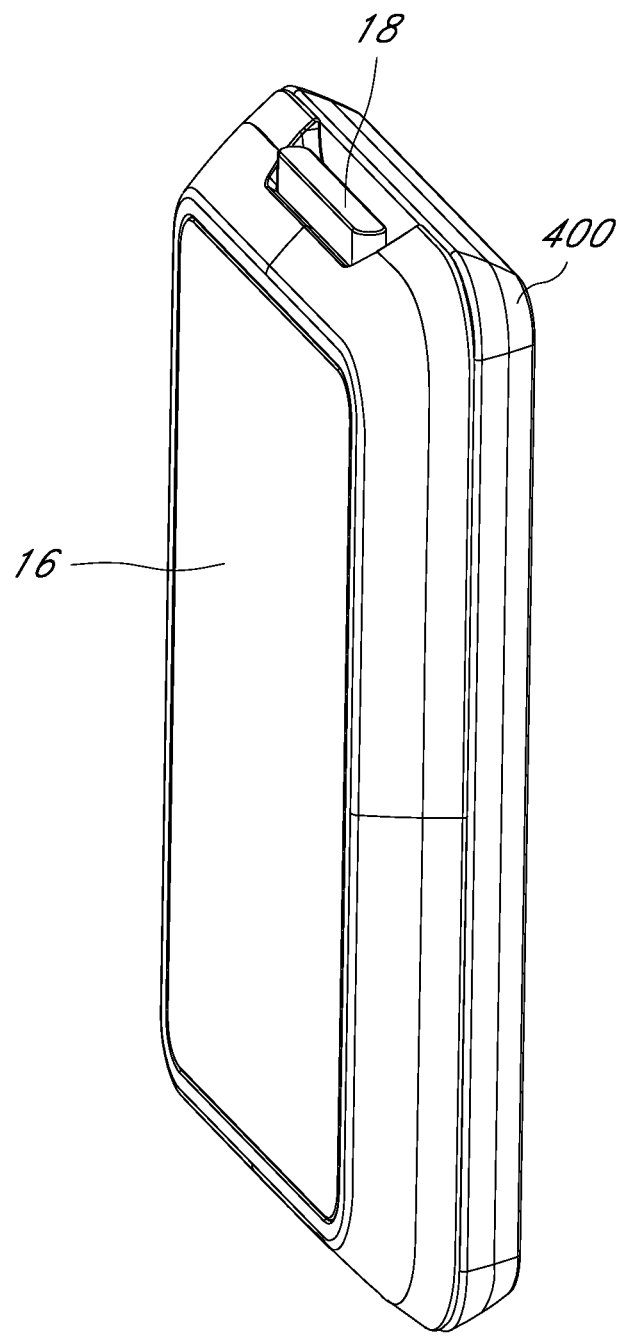
FIG. 8C is an isometric view of the speaker module of FIG. 3A coupled to the mounting plate of FIG. 8A.

FIG. 8C is an isometric view of the speaker module 16 coupled to the mounting plate 400. The male connector 150 of the speaker module 16 is engaged with the female connector 110 of the mounting plate 400. Thus, the mounting plate 400 permits the speaker module 16 to be mounted to various other objects, like belt clips. The button 18 can be depressed to decouple the speaker module 16 from the mounting plate 400.

Figure 9A:
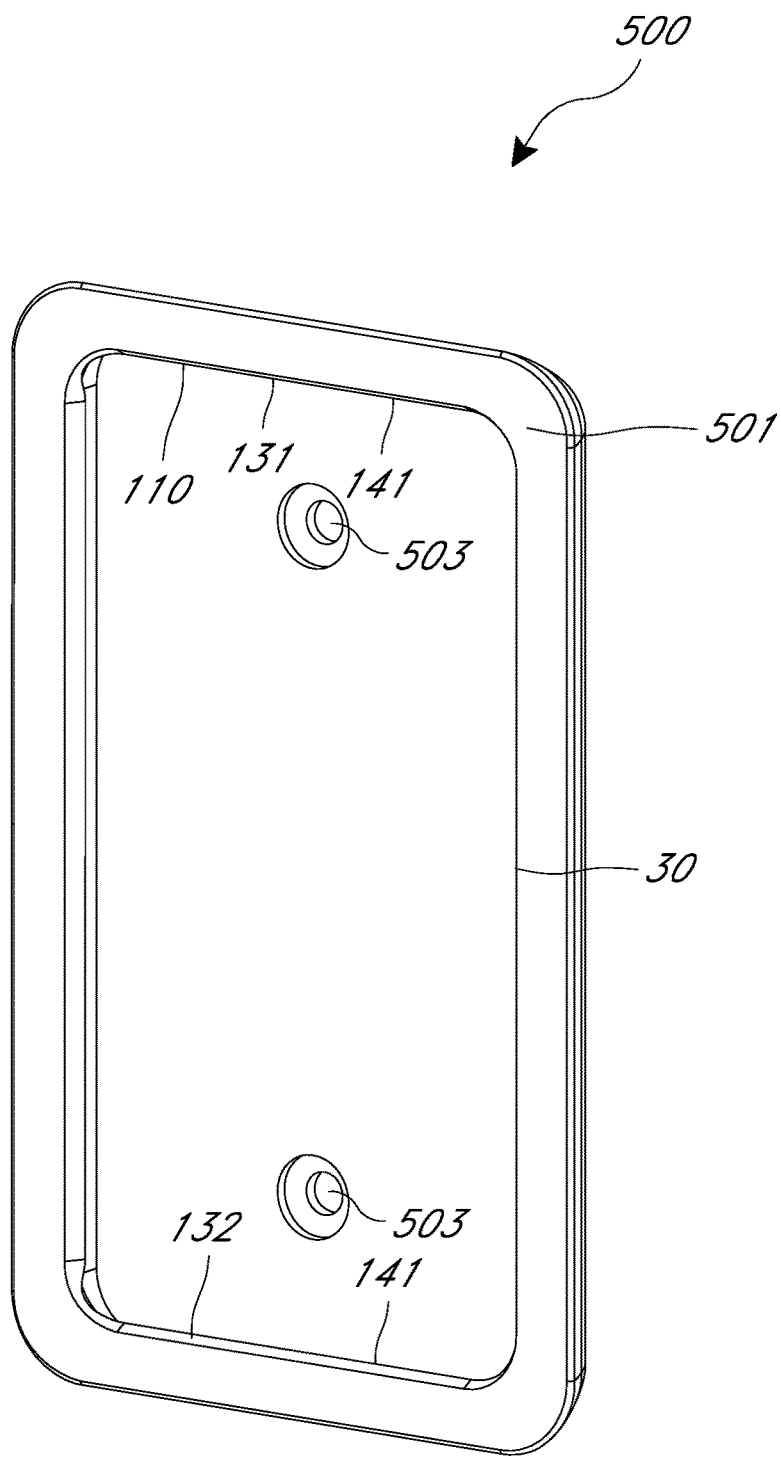
FIG. 9A illustrates an isometric view of another embodiment of a mounting plate.
Figure 9B:
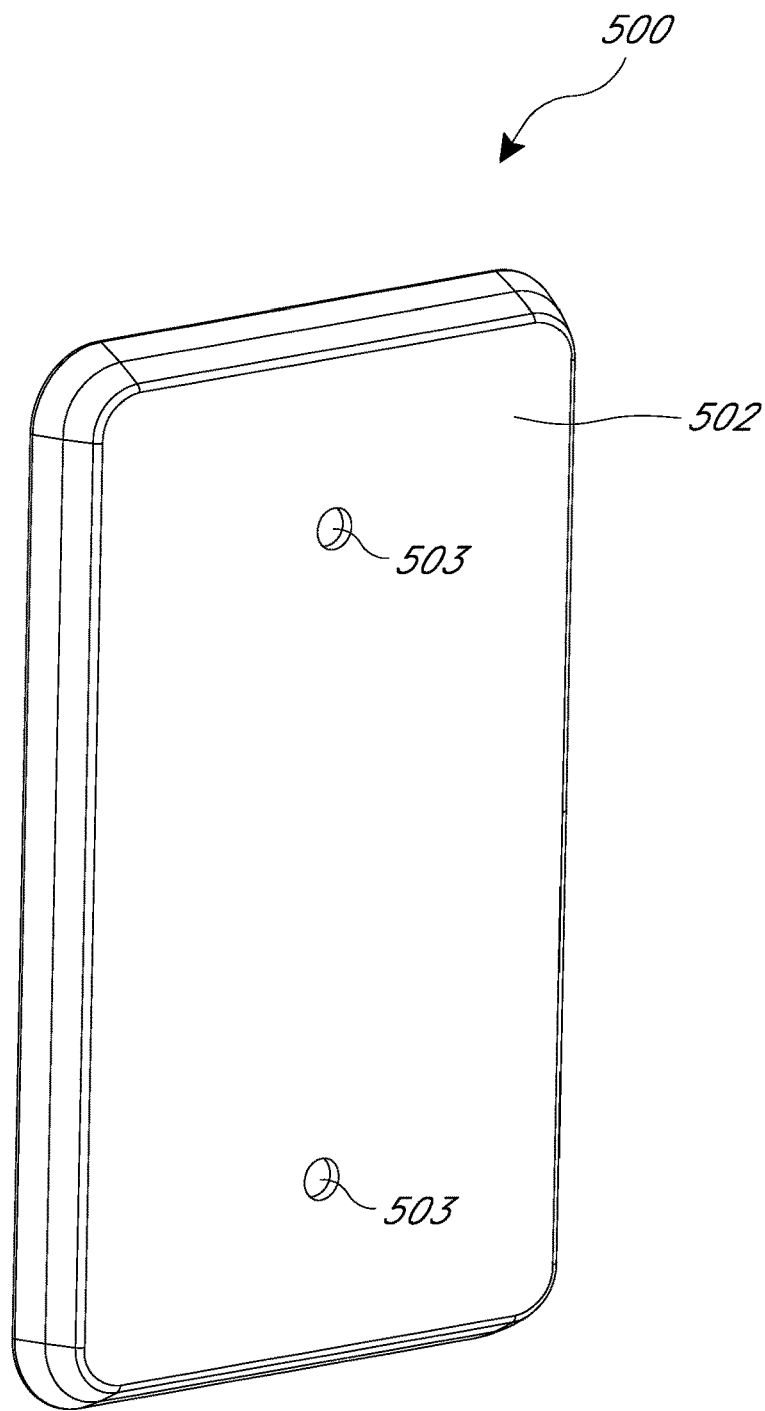
FIG. 9B is a back isometric view of the mounting plate of FIG. 9A.

FIG. 9A illustrates an isometric view of another embodiment of a mounting plate 500 with a female connector 110. The mounting plate 500 is configured to be mounted to a wall or other surface. Similar to the mounting plates 200, 400 described herein, the female connector 110 of the mounting plate 500 includes a recess 31 formed in the front surface 501 thereof. The recess 31 includes the periphery 30 as described herein, including, for example flanges 141 on the top and bottom edges 131, 132. The recess 31 is configured to receive the protruding back housing 54 of a male connector 150 as described herein. When the male connector 150 is coupled to the female connector 110, the flanges 151 are positioned behind the flanges 141 as previously described to couple the two devices together. Additionally, the mounting plate 500 includes two holes 503 extending therethrough. The holes 503 permit the mounting plate 500 to be attached to a wall using for example, mechanical fasteners such as screws or nails. In some embodiments, the mounting plate 500 may include adhesives (such as double-sided tape) and/or magnets with or without the holes 503 for mounting the mounting plate 500, FIG. 9B is a back isometric view of the mounting plate 500 with a back surface 202. Although not illustrated, the speaker module 16 can be coupled to the mounting plate 500.

Figure 10A:
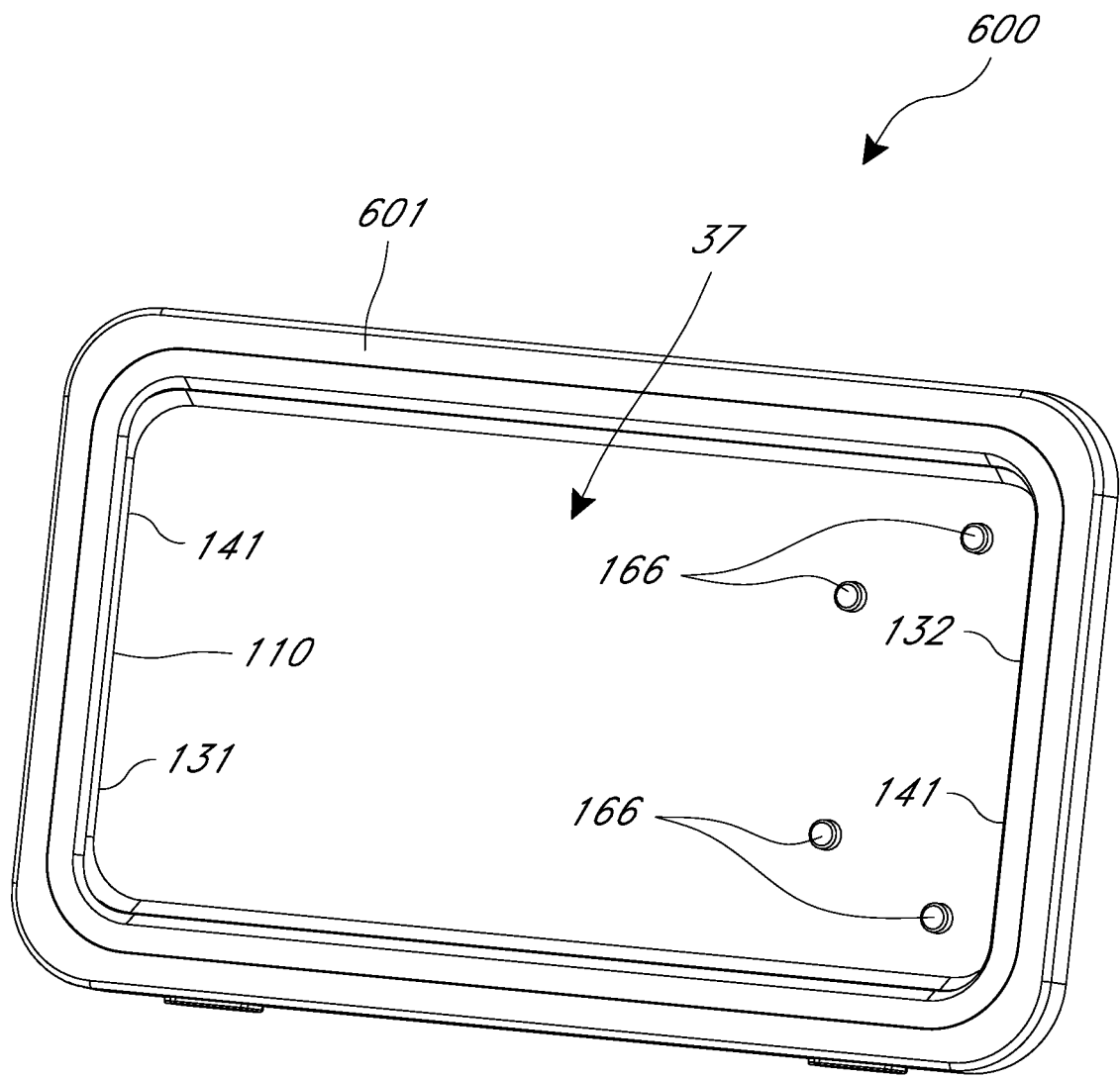
FIG. 10A illustrates a front isometric view of an embodiment of a charging device.

FIG. 10A illustrates a front isometric view of an embodiment of a charging device 600 that includes a female connector 110. The charging device 600 may be configured to charge the speaker module 16. In some embodiments, the charging device 600 is configured to charge the speaker module 16 via wired or wireless charging, such as inductive charging, large distance RF charging, or the like. In other embodiments, the charging device may include one or more electrical contacts configured to engage electrical contacts on an accessory module, such as the speaker module 16, during charging.

As illustrated in FIG. 10A, the front surface 601 includes a female connector 110 having a recess 37 and flanges 141 on top and bottom edges 131, 132 as previously described. In some embodiments, the charging device 600 may be positioned on its side during use (as illustrated) such that the top and bottom edges 131, 132 are positioned on right and left sides of the device. The female connector 110 is configured to engage the male connector 150 to couple the speaker module 16 to the charging device 600. The recess 37 can also include one or more charging pins 167 that are positioned to physically and electrically connect with the charging pins 166 of an accessory such as the speaker module 16*b* or a battery device.

Figure 10B:
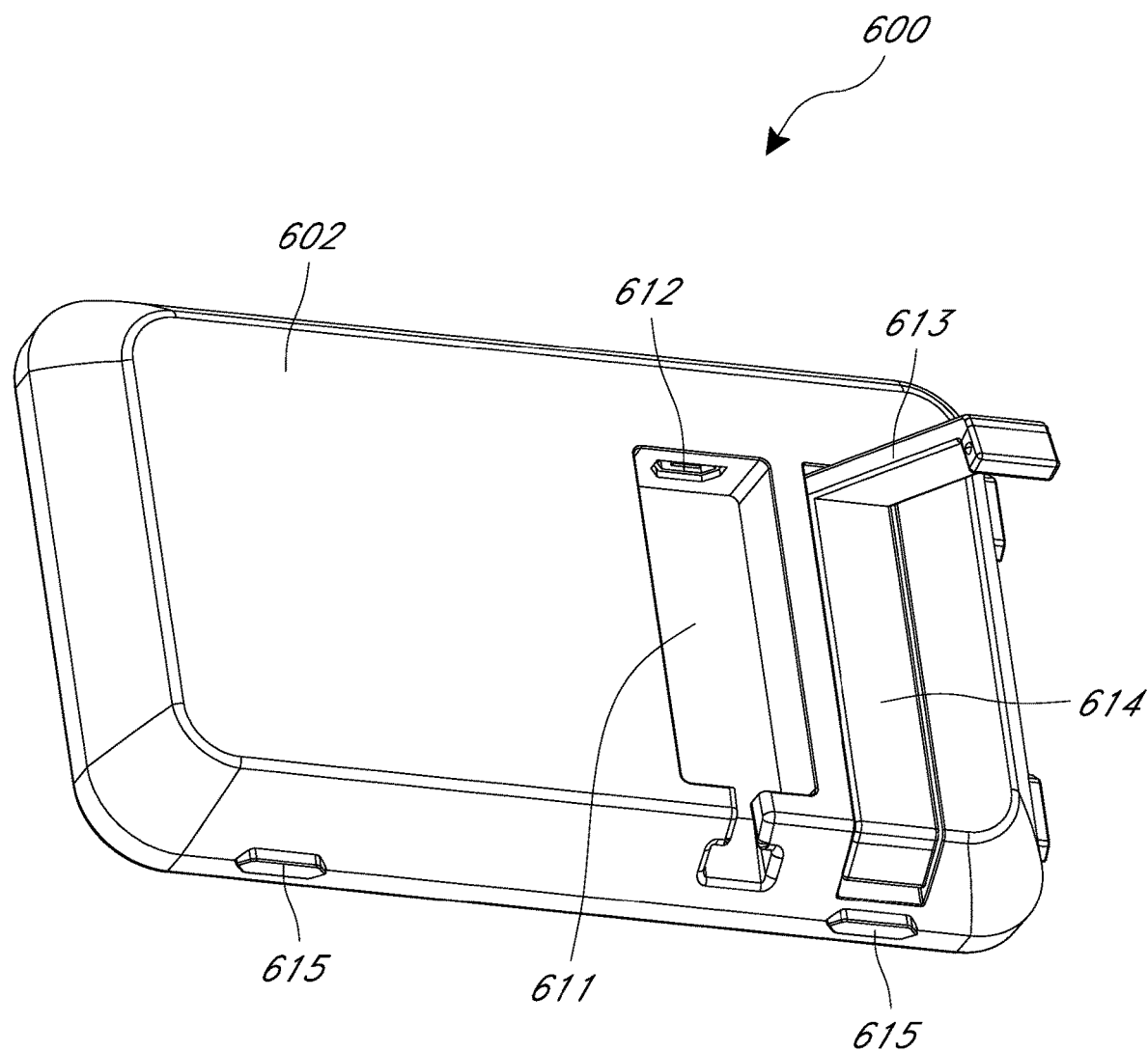
FIG. 10B is a back isometric view of the charging device of FIG. 10A.

FIG. 10B is a back isometric view of the charging device of 600. As illustrated, a back surface 602 of the charging device 600 can include a stand or leg 613 and feet 615. The leg can be configured to prop the charging device 600 up, if desired. As illustrated, for some embodiments, a recess 614 is formed in the back surface such that the leg 613 can be folded down into the recess 614. The back surface 602 also includes a charging port 612. The charging port 612 is configured to receive a cable, which can be connected to a power source. The charging port 612 may be positioned within a recess 611 that is configured to receive the cable.

Figure 10C:
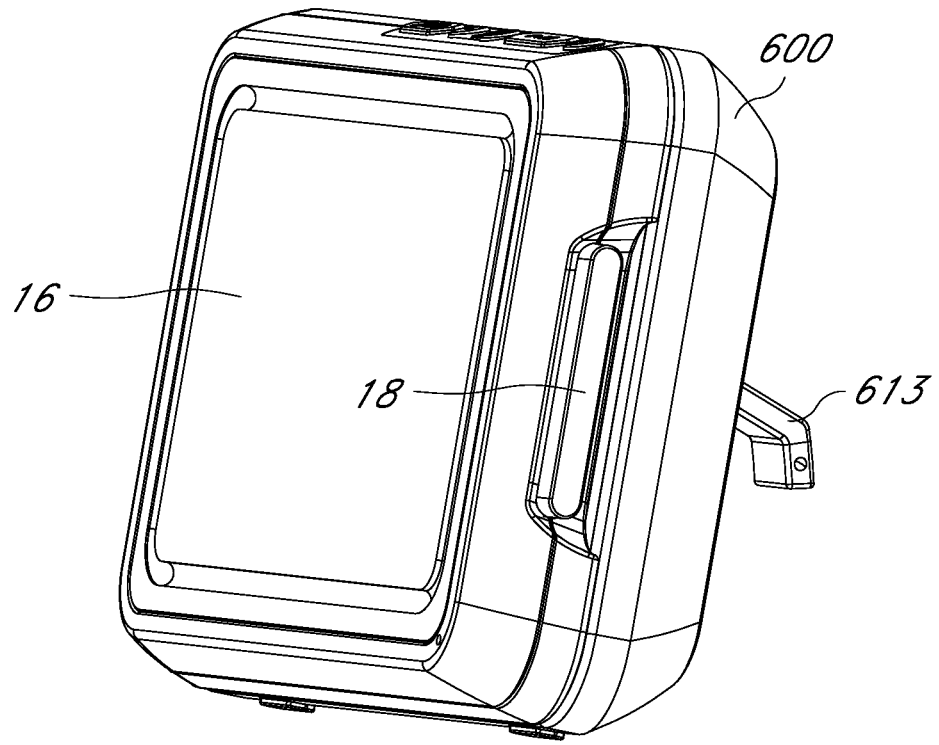
FIG. 10C is an isometric view of the speaker device of FIG. 3A coupled to the charging device of FIG. 10A.

FIG. 10C is an isometric view of the speaker device 16 coupled to the charging device 600. The male connector 150 of the speaker device 16 couples to the female connector 110 of the charging device 600 in the manner previously described.

In some embodiments, any of the devices described herein as having a female connector 110 can instead include a male connector 150. Similarly, any of the devices described herein as having a male connector 150 can instead include a female connector 110.

In some embodiments, an insert can be configured to be inserted into the female connector 110 when the female connector 110 is not coupled to a male connector 150. In some embodiments, the insert can fill the opening 36 or recess 37 to create a smooth surface. The insert can include decorative features, such as images.

Although some of the foregoing embodiments illustrate and/or describe attachment of a speaker or mounting plate to a case, any other accessory module or accessory can be similarly attached to the case. Such other accessories include a charging device, storage device (e.g., data vault with cloud communication capabilities), wallet, bottle opener, wireless charger, headphone amp, personal hotspot module, or decorative plate or case.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature. The term "substantially flush" or "generally flush" as used herein may refer to surfaces that are in the same plane or are co-planar, with the respective plane corresponding to each surface being separated by a distance of less than or equal to 3 millimeters. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees, and the term "generally perpendicular" can refer to something that departs from exactly perpendicular by less than or equal to 20 degrees.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A mounting assembly for a mobile device, the mounting assembly comprising:
   a case sized and shaped to at least partially enclose a mobile device, the case comprising a first connector, the first connector comprising:
   a first flange; and
   a second flange positioned opposite the first flange; and
   an accessory comprising a second connector configured to be removably coupled to the first connector of the case, the second connector comprising:
   a third flange configured to engage with the first flange of the case, the third flange moveable to selectively engage and disengage the first flange;
   a fourth flange configured engage with the second flange of the case; and
   an actuator configured to move the third flange to selectively engage and disengage with the first flange,
   wherein the third and fourth flanges are configured to engage the first and second flanges to securely assemble the accessory to the case.

2. The mounting assembly of claim 1, wherein the first connector comprises an opening having a periphery, and wherein the first and second flanges extend into the opening from the periphery, the opening configured to accept at least partly the second connector.

3. The mounting assembly of claim 2, wherein the first connector comprises a portion extending at a predetermined angle relative a surface of the case configured to face outwardly away from the mobile device, the portion configured to guide the second connector into the opening for the second connector to engage with the first connector.

4. The mounting assembly of claim 3, wherein the predetermined angle ranges from 1 to 60 degrees.

5. The mounting assembly of claim 2, wherein the second connector comprises a projection configured to at least partially enter the opening of the first connector.

6. The mounting assembly of claim 5, wherein the third flange extends an extent less than an extent of a side of the projection of the second connector.

7. The mounting assembly of claim 5, wherein the fourth flange extends at least an extent of a side of the projection of the second connector.

8. The mounting assembly of claim 2, wherein the second connector comprises a portion configured to slidably engage the portion of the first connector to guide the second connector relative to the first connector.

9. The mounting assembly of claim 2, wherein the first flange extends at least an extent of a side of the opening of the first connector.

10. The mounting assembly of claim 2, wherein the second flange extends at least an extent of a side of the opening of the first connector.

11. The mounting assembly of claim 1, wherein the actuator is biased in a predetermined position by an elastic component operatively connected to the actuator.

12. The mounting assembly of claim 1, wherein the third and fourth flanges are configured to engage the first and second flanges to inhibit rotation or lateral movement of the second connector relative to the first connector.

13. The mounting assembly of claim 1, wherein the actuator is directly connected to or formed from a monolithic material with the third flange.

14. An accessory mounting device for a portable accessory, the accessory mounting device comprising:
   a connector configured to mount to a housing having a first flange and a second flange, the connector comprising:
   a third flange configured to releasably engage with the first flange; and
   a fourth flange configured to releasably engage with the second flange; and
   an actuator configured to move the third flange to selectively engage and disengage with the first flange,
   wherein the third and fourth flanges are configured to engage the first and second flanges to securely mount the portable accessory to the accessory mounting device.

15. The accessory mounting device of claim 14, wherein the connector comprises a portion configured to slidably engage the housing to guide the housing relative to the connector.

16. The accessory mounting device of claim 14, wherein the connector comprises a projection configured to at least partially enter an opening or a recess of the housing.

17. The accessory mounting device of claim 16, wherein the third flange extends an extent less than an extent of a side of the projection of the connector.

18. The accessory mounting device of claim 16, wherein the fourth flange extends at least an extent of a side of the projection of the connector.

19. The accessory mounting device of claim 14, wherein the actuator is directly connected to or formed from a monolithic material with the third flange.

20. The accessory mounting device of claim 14, further comprising an elastic component configured to bias the actuator in a predetermined position.

21. The accessory mounting device of claim 14, wherein the third and fourth flanges are configured to engage the first and second flanges to inhibit rotation or lateral movement of the connector relative to the housing.

22. The accessory mounting device of claim 14, wherein the fourth flange is capable of pivoting about the second flange to position the third flange to engage the first flange.

* * * * *